(12) United States Patent
Pohl

(10) Patent No.: US 11,504,707 B2
(45) Date of Patent: Nov. 22, 2022

(54) ION EXCHANGE STATIONARY PHASES FOR ANALYZING POLYVALENT IONS

(71) Applicant: DIONEX CORPORATION, Sunnyvale, CA (US)

(72) Inventor: Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 319 days.

(21) Appl. No.: 15/804,868

(22) Filed: Nov. 6, 2017

(65) Prior Publication Data

US 2019/0134621 A1 May 9, 2019

(51) Int. Cl.

| | | |
|---|---|---|
| *B01J 41/13* | (2017.01) | |
| *B01D 15/36* | (2006.01) | |
| *B01J 41/20* | (2006.01) | |
| *B01J 41/04* | (2017.01) | |
| *G01N 30/96* | (2006.01) | |
| *G01N 30/00* | (2006.01) | |
| *B01J 41/05* | (2017.01) | |
| *B01J 41/07* | (2017.01) | |

(52) U.S. Cl.
CPC ............ *B01J 41/13* (2017.01); *B01D 15/361* (2013.01); *B01J 41/04* (2013.01); *B01J 41/05* (2017.01); *B01J 41/07* (2017.01); *B01J 41/20* (2013.01); *G01N 30/96* (2013.01); *G01N 2030/484* (2013.01)

(58) Field of Classification Search
None
See application file for complete search history.

(56) References Cited

U.S. PATENT DOCUMENTS

| | | |
|---|---|---|
| 7,291,395 B2 | 11/2007 | Pohl et al. |
| 7,468,130 B2 | 12/2008 | Liu et al. |
| 9,034,447 B2 | 5/2015 | Pohl et al. |
| 9,034,477 B2 | 5/2015 | Amici et al. |
| 9,132,364 B2 | 9/2015 | Srinivasan et al. |
| 9,283,494 B2 | 3/2016 | Pohl et al. |
| 9,486,799 B2 | 11/2016 | Pohl |
| 2005/0181224 A1 | 8/2005 | Pohl et al. |
| 2006/0180549 A1 | 8/2006 | Liu et al. |
| 2007/0062854 A1 | 3/2007 | Pohl et al. |

(Continued)

FOREIGN PATENT DOCUMENTS

| | | |
|---|---|---|
| WO | WO-2011106720 A2 | 9/2011 |
| WO | WO-2012125493 A1 | 9/2012 |
| WO | WO-2014043174 A1 | 3/2014 |

OTHER PUBLICATIONS

Extended European Search Report for Application No. 18204155.8, dated Mar. 14, 2019, 8 pages.

(Continued)

*Primary Examiner* — Kara M Peo

(57) ABSTRACT

Ion exchange stationary phases are prepared with diprimary diamines for applications such as separating samples that contain polyvalent anions. The ion exchange stationary phase includes a series of condensation polymer reaction products bound to a substrate. The condensation polymer products are formed with diprimary diamines and polyepoxide compounds. The ion exchange stationary phases described herein are capable of separating monovalent and highly polyvalent anions relatively quickly with relatively low eluent concentrations in one chromatographic run.

14 Claims, 23 Drawing Sheets

(56) References Cited

U.S. PATENT DOCUMENTS

| | | |
|---|---|---|
| 2009/0130767 A1 | 5/2009 | Liu et al. |
| 2011/0210055 A1 | 9/2011 | Srinivasan et al. |
| 2012/0231195 A1 | 9/2012 | Pohl et al. |
| 2014/0069870 A1 | 3/2014 | Pohl |
| 2016/0370329 A1 | 12/2016 | Jayaraman et al. |

OTHER PUBLICATIONS

Extended European Search Report for Application No. 19164245.3, dated Jul. 23, 2019, 9 pages.
Extended European Search Report for Application No. 19164250.3, dated Jul. 23, 2019, 8 pages.
Dionex Data Sheet 60497, IonPac AS24 Anion-Exchange col. 5 pgs., Dec. 22, 2008.
Dionex Data Sheet 60507, IonPac AS24 AG24, 34 pgs., Dec. 2008.
Dionex IonPac AS26 Column Product Manual, 065444-03, 49 pgs., Jun. 2013.
IonPac AS24A Anion-Exchange Column, Dionex Data Sheet 70335, 6 pgs., 2013.
IonPac AS24A Column, Dionex Product Manual, 065464-04, 55 pgs., May 2013.
IonPac AS26 Anion-Exchange Column, 70830 Data Sheet, 6 pgs., 2013.

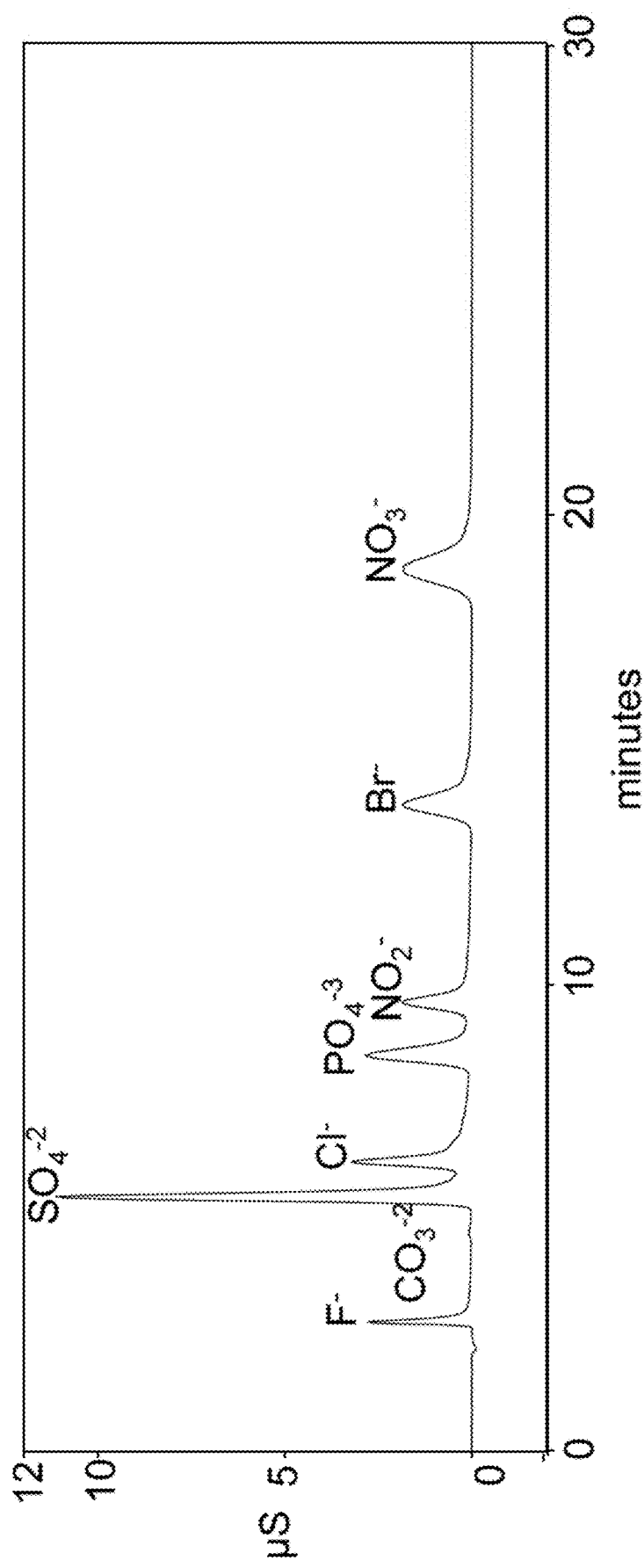

FIG. 15

| KOH (mM) | Chloride (minutes) | Nitrate (minutes) | Phosphate (minutes) | Phytate (minutes) |
|---|---|---|---|---|
| 20 | 3.25 | 6.673 | 2.49 | 2.493 |
| 15 | 3.587 | 8.103 | 2.627 | 2.943 |
| 13 | 3.783 | 8.97 | 2.74 | 4.347 |
| 11 | 4.067 | 10.177 | 2.94 | 12.66 |
| 10 | 4.24 | 10.943 | 3.09 | 30.42 |
| 9 | 4.463 | 11.893 | 3.303 | |
| 8 | 4.73 | 13.07 | 3.59 | |
| 7 | 5.087 | 14.587 | 4.03 | |
| 6 | 5.553 | 16.607 | 4.717 | |
| 5 | 6.217 | 19.427 | 5.89 | |

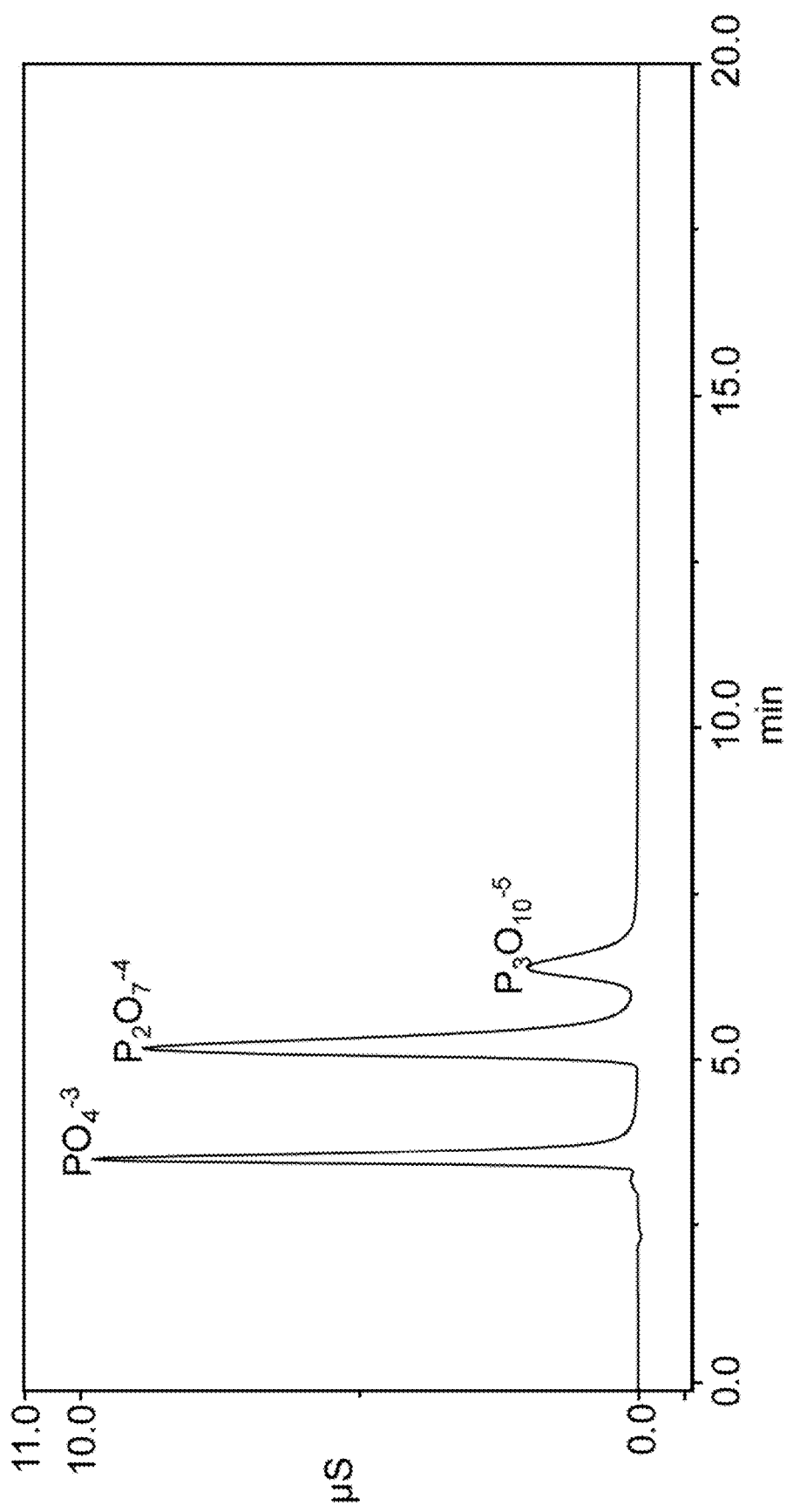

ION EXCHANGE STATIONARY PHASES FOR ANALYZING POLYVALENT IONS

FIELD OF THE INVENTION

The invention generally relates to ion exchange stationary phases prepared with diprimary diamines for applications such as separating samples that contain polyvalent anions.

BACKGROUND

Chromatography is a widely used analytical technique for the chemical analysis and separation of molecules. Chromatography involves the separation of one or more analyte species from other matrix component present in a sample. A stationary phase of a chromatography column is typically selected so that there is an interaction with the analyte. Such interactions can be ionic, hydrophilic, hydrophobic, or combinations thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase or eluent are terms used to describe a liquid solvent or buffer solution that is pumped into a chromatography column inlet. During this competition, the analyte and matrix components will elute off of the stationary phase as a function of time and then be subsequently detected at a detector. Examples of some typical detectors are a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

Under certain circumstances, ion exchange stationary phases can have a stronger affinity to polyvalent anions than monovalent anions. Presumably, the more highly charged anions can bind more strongly to the positively charged ion exchange stationary phase due to more intense electrostatic forces. This results in polyvalent anions requiring more time to elute than monovalent anions. More highly charged anions typically require more concentrated eluents for elution. This increases the cost of analysis since relatively expensive, high purity reagents are typically required. Applicant believes that there is a need for ion exchange stationary phases that have lower affinity to polyvalent anions so that polyvalent anions and monovalent ions can be analyzed together more quickly and with less concentrated eluents.

SUMMARY

A first aspect of an ion exchange stationary phase includes a negatively charged substrate particle, a first condensation polymer reaction product attached to the negatively charged substrate particle, a second condensation polymer reaction product covalently attached to the first condensation polymer reaction product, a third condensation polymer reaction product covalently attached to the second condensation polymer reaction product, a fourth condensation polymer reaction product covalently attached to the third condensation polymer reaction product, a fifth condensation polymer reaction product covalently attached to the fourth condensation polymer reaction product. The first condensation polymer reaction product of i) at least a first diprimary diamine, and ii) at least a first polyepoxide compound. The second condensation polymer reaction product of i) at least an amine group of the first condensation polymer reaction product, and ii) at least a second polyepoxide compound. An amine group of the first condensation polymer reaction product includes a positive charge so that the first condensation polymer reaction product is ionically coupled to the negatively charged substrate particle. The third condensation polymer reaction product of i) at least an epoxide group of the second condensation polymer reaction product, and ii) at least a second diprimary diamine. The fourth condensation polymer reaction product of i) at least an amine group of the third condensation polymer reaction product, and ii) at least a third polyepoxide compound. The fifth condensation polymer reaction product of i) at least an epoxide group of the fourth condensation polymer reaction product, and ii) at least a third diprimary diamine.

In regards to the first aspect, the first condensation polymer reaction product includes a plurality of quaternary amines and a plurality of hydroxyl groups. The second condensation polymer reaction product includes a plurality of hydroxyl groups and a plurality of ether groups. The third condensation polymer reaction product includes a plurality of quaternary amines. The fourth condensation polymer reaction product includes a plurality of hydroxyl groups and a plurality of ether groups. The fifth condensation polymer reaction product includes a plurality of primary amines and a plurality of secondary amines. The negatively charged substrate particle includes a crosslinked divinylbenzene and ethylvinyl benzene particle, in which at least a surface of the negatively charged substrate particle includes sulfonate groups. The first polyepoxide compound, second polyepoxide compound, and third polyepoxide compound can each be a diepoxide compound. The diepoxide compound can include 1,4-butanediol diglycidyl ether. The first diprimary diamine, the second diprimary diamine, and the third diprimary diamine can be the same.

A second aspect of an ion exchange stationary phase can be formed by a method of reacting at least a first polyepoxide compound with a first diprimary diamine to form a first polymer layer on a substrate particle, in which the first polymer layer includes secondary amines. Next, at least a portion of the secondary amines of the first polymer layer are reacted with a second polyepoxide compound to form a second polymer layer where the secondary amine of the first polymer layer is converted to a tertiary or a quaternary amine, in which the second polymer layer includes pendant epoxide groups. Next, at least a portion of the pendant epoxide groups of the second polymer layer are reacted with a second diprimary diamine to form a third polymer layer, in which the third polymer layer includes pendant primary amine groups and secondary amine groups. Next, at least a portion of the pendant primary amine groups and at least a portion of the secondary amine groups of the third polymer layer are reacted with a third polyepoxide compound to form a fourth polymer layer where the pendant primary amine groups and the secondary amine groups of the third polymer layer are converted to quaternary amines, in which the fourth polymer layer includes pendant epoxide groups. Next, at least a portion of pendant epoxide groups of the fourth polymer layer are reacted with a third diprimary diamine to form a fifth polymer layer, in which the fifth polymer layer includes pendant primary amine groups and secondary amine groups.

In regards to the first or second aspect, the first, second, or third polyepoxides can include an alkyldiol diglycidyl ether. The first diprimary diamine may be selected from the group consisting of diaminobutane, diaminohexane, diaminotriethylene glycol, lysine, and a combination thereof. The first, second, or third diprimary diamine can include a structure according to Formula (I):

or a salt thereof, in which L is a linker selected from substituted alkyl, unsubstituted alkyl, substituted heteroalkyl, unsubstituted heteroalkyl, substituted aryl, unsubstituted aryl, substituted heteroaryl, unsubstituted heteroaryl, substituted heterocycloalkyl, unsubstituted heterocycloalkyl, and a combination thereof. The substrate particle can include a copolymer of divinylbenzene and ethylvinylbenzene, in which the substrate particle is a negatively charged particle. The first diprimary diamine, the second diprimary diamine, and the third diprimary diamine can be the same. In addition, first diprimary diamine, the second diprimary diamine, and the third diprimary diamine can be different.

A third aspect of an ion exchange stationary phase includes treating the fifth polymer layer of either the first or second aspect by reacting with a glycidol.

A method of using either an ion exchange stationary phase where a chromatography column contains the ion exchange stationary phase according to one of the first, second, or third aspect. The method includes flowing an eluent through the chromatography column, in which the eluent includes a hydroxide. The method further includes separating at least one analyte from a sample injected into the chromatography column. The method further includes adjusting a concentration of the hydroxide to shift a retention time of an analyte peak so that it does not overlap with another analyte peak.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

FIGS. 8A to 8E illustrate chromatograms of a sample containing various anions using a first embodiment of an ion exchange resin having a base polymer layer of methyl amine and 1,4-butanediol diglycidyl ether that was subsequently treated with four cycles of a) 1,4-butanediol diglycidyl ether and b) diaminotriethylene glycol. FIGS. 8A, 8B, 8C, 8D, and 8E corresponds to an eluent concentration of 20, 25, 30, 35, and 40 mM KOH, respectively.

FIG. 15 illustrates a table showing the effect of KOH eluent concentration on the peak retention time for various monovalent and polyvalent anions.

FIG. 19 illustrates a chromatogram of a standard solution containing polyvalent anions using the fourth embodiment of the ion exchange resin.

DETAILED DESCRIPTION OF EMBODIMENTS

Figure 1:
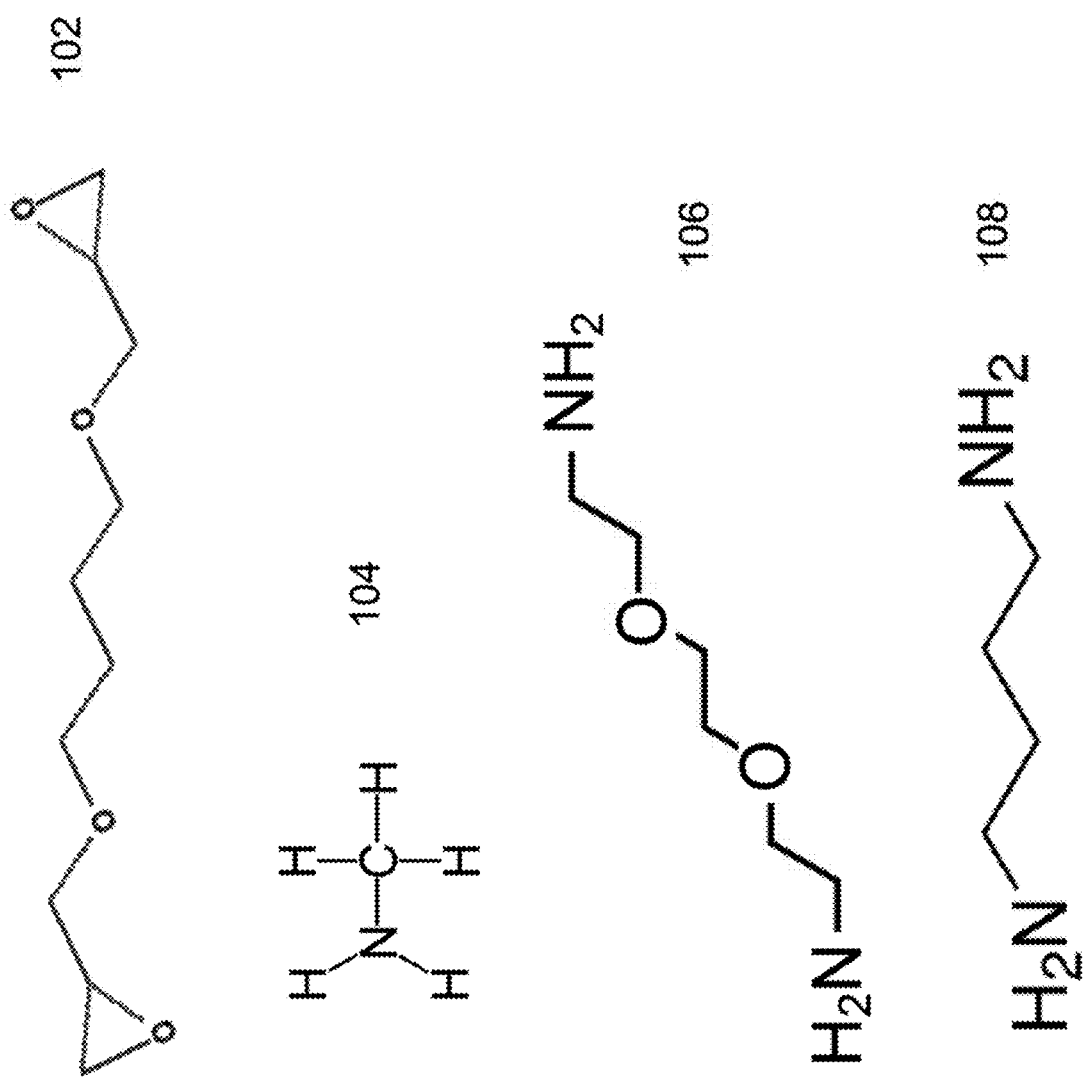
FIG. 1 illustrates various chemical structures of reagents that can be used in forming condensation polymers for ion exchange resins.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Herein the term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e., $C_1$-$C_{10}$ means one to ten carbons). Examples of saturated hydrocarbon radicals include, but are not limited to, groups such as methyl, ethyl, n-propyl (e.g., —$CH_2$—$CH_2$—$CH_3$, —$CH_2$—$CH_2$—$CH_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl". Alkyl groups that are limited to hydrocarbon groups are termed "homoalkyl". The term "alkyl" can also mean "alkylene" or "alkyldiyl" as well as alkylidene in those cases where the alkyl group is a divalent radical.

Herein the term "alkylene" or "alkyldiyl" by itself or as part of another substituent means a divalent radical derived from an alkyl group, as exemplified, but not limited, by —$CH_2CH_2CH_2$-(propylene or propane-1,3-diyl), and further includes those groups described below as "heteroalkylene". Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

Herein the term "alkylidene" by itself or as part of another substituent means a divalent radical derived from an alkyl group, as exemplified, but not limited, by $CH_3CH_2CH_2$= (propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

Herein the terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

Herein the term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—$NHCH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)2-$CH_3$, —CH═CH—O—$CH_3$, —Si($CH_3$)$_3$, —$CH_2$—CH═N—$OCH_3$, and —CH═CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Optionally, for alkylene and heteroalkylene linking groups, no orientation of the linking group is implied by the direction in which the formula of the linking group is written. For example, the formula —$CO_2R'$— optionally represents both —C(O)OR' and —OC(O)R'.

Herein the terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

Herein the terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

Herein the term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, herein the term "aryl" when used in combination with other terms (e.g., aryloxy, arylthioxy, arylalkyl)

includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R''', —OC(O)R', —C(O)R', —CO$_2$R', —CONR'R", —OC(—)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —OS(O)$_2$R', —S(O)$_2$NR'R", —NRSO2R', —CN and —NO$_2$ in a number ranging from zero to (2m'+1), where m' is the total number of carbon atoms in such radical. R', R", R''' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R''', —OC(O)R', —C(O)R', —CO2R', —CONR'R", —OC(O)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro (C$_1$-C$_4$)alkyl, in a number ranging from zero to the total number of open valences on the aromatic ring system; and where R', R", R''' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R''' and R"" groups when more than one of these groups is present.

Ion exchange stationary phases were synthesized with a diprimary diamine that exhibit exceptionally low affinity for polyvalent anions. Generally, ion exchange selectivity results in progressively higher affinity for polyvalent species, requiring progressively higher eluent concentrations to elute polyvalent ions. The phases described herein with diprimary diamines showed unexpected relationships between eluent concentration and retention time for polyvalent species. Such phases can be used to achieve separation of polyvalent anions from most common monovalent anionic species in a relatively short time scale. A monovalent anion refers to an anion that has a single negative charge and a polyvalent anion refers to an anion that has a more than one negative charge. It should be noted that ion exchange stationary phases may also be referred to interchangeably as ion exchange resins.

In an embodiment, a series of polymer layers can be formed on a substrate. A polymer formed in a polymerization reaction with an amine and a polyepoxide may be referred to as a condensation polymer, condensation polymer reaction product, epoxy resin, or epoxy amine resin. A polyepoxide includes a compound having two or more epoxide functional groups such as a diepoxide. An example of a polyepoxide may be an alkyldiol diglycidyl ether. Other examples of polyepoxides include butadiene diepoxide, ethyleneglycol diglycidyl ether, butanediol diglycidyl ether (e.g., 1,4-butanediol diglycidyl ether), diethyleneglycol diglycidyl ether, hexanediol diglycidyl ether, glycerol triglycidyl ether and numerous other compounds containing two or more epoxy groups including epoxy resins commonly used in commercial epoxy formulations.

Figure 2:
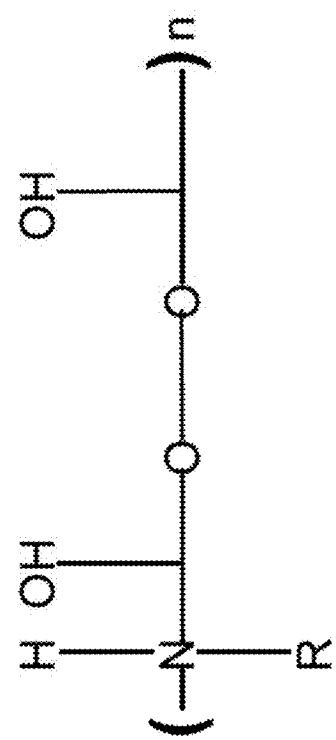
FIG. 2 illustrates a simplified representation of an alkyldiol diglycidyl ether reacting with a primary amine to form a condensation polymer.
Figure 3:
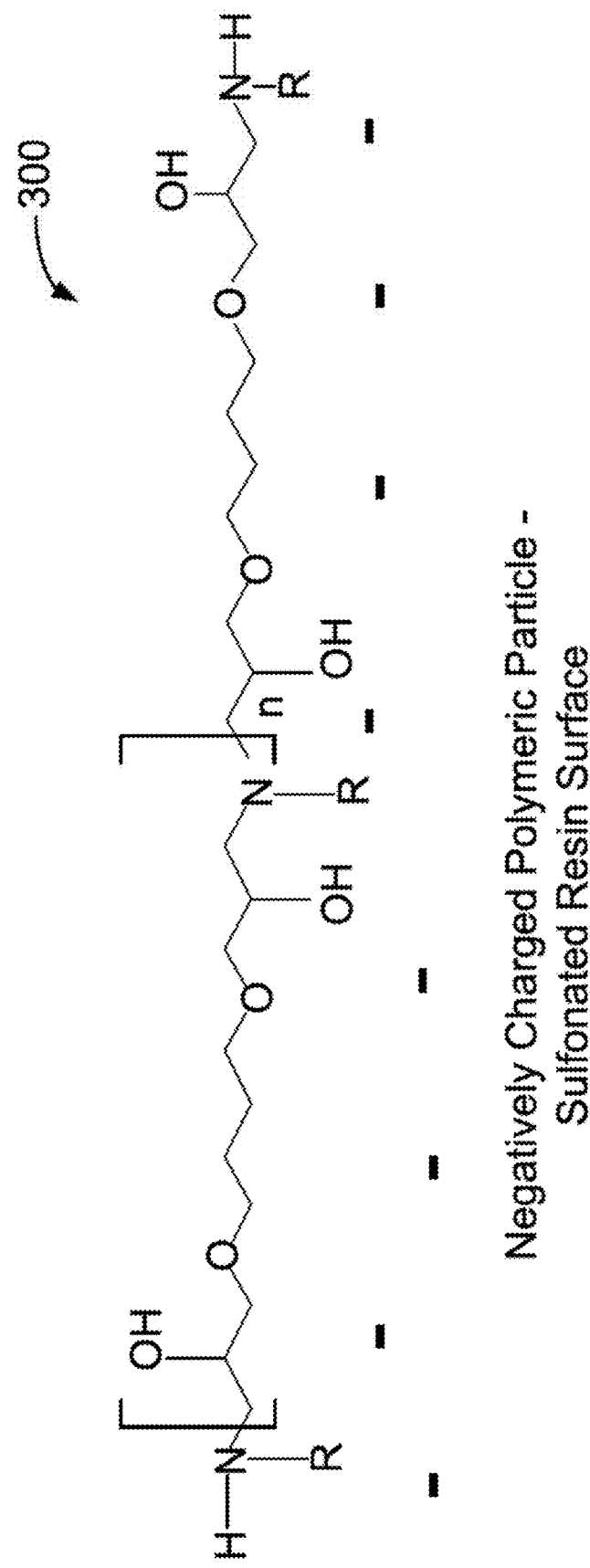
FIG. 3 illustrates a schematic of the condensation polymer on a negatively charged particle.

FIG. 1 illustrates various chemical structures of reagents that can be used in forming a base polymer on the substrate. The ground or base polymer layer can be formed on a negatively charged particle by reacting amines with alkyldiol diglycidyl ethers. For example, a primary amine can be reacted with an alkyldiol diglycidyl ether to form a linear polymer, as illustrated in FIG. 2. An example of a primary amine and an alkyldiol diglycidyl ether respectively include a methyl amine 104 and 1,4-butanediol diglycidyl ether 102 (see FIG. 1). In an aspect, the mole ratio can be a 1:1 mole ratio of primary amine and diglycidyl ether to form the base polymer layer. Although the base polymer layer is depicted as linear, it is possible for some of the amine groups to be quaternized and form either a branched or crosslinked portions. The base layer 300 can be formed in the presence of a negatively charged polymeric particle where the base layer associates and/or partially binds with the negatively charged polymeric particle, as illustrated in FIG. 3.

The negatively charged polymeric particle can be any inert polymeric substrate particle that is chemically stable under the intended conditions of use (e.g., pH 0 to 14). The polymeric particle may be based on a divinylbenzene (DVB) crosslinking monomer and a support resin monomer where the support resin monomer may be an ethylvinylbenzene (EVB) monomer, a styrene monomer, and a combination thereof. The mole percent of DVB can be 55% and EVB can be 45%. The support resin particles may have a diameter ranging from about 1 micron to about 20 microns, preferably from about 2 microns to about 10 microns, and more preferably from about 3 microns to about 7 microns. The support resin particles may have a surface area ranging from about 20 m$^2$/g to about 800 m$^2$/g, preferably from about 20 m²/g to about 500 m²/g, more preferably from about 20 m²/g to about 100 m²/g, and yet more preferably be about 20 m²/g to about 30 m²/g. The support resin particles may have a pore size ranging from about 1000 angstroms to about 2000 angstroms.

In some embodiments, the negatively charged substrate particle may include one or more super macroporous particles (SMP). SMP can be obtained from commercial sources, including Agilent PLRP-s1000A and Waters Styragel HR4-HR6. The super macroporous particle can have a diameter of 4-6 μm, a surface area of 20-30 m²/g, pore sizes of 1000 Å-2000 Å, and a crosslinking mole ratio of 55% of the divinylbenzene and a mole ratio of 45% of the ethylvinylbenzene.

Alternatively, the polymeric particles may be based on other vinylaromatic monomers such as alpha-methylstyrene, chlorostyrene, chloromethylstyrene, vinyltoluene, vinylnaphthalene, and a combination thereof. The polymeric particles may also be based on unsaturated monomers, and copolymers of the above vinylaromatic monomers and unsaturated monomers. Preferably such monomers will be copolymerized with a vinylaromatic crosslinking monomer such as divinylbenzene but other vinylaromatic crosslinking monomers such as trivinylbenzene, divinylnaphthalene, and a combination thereof may also be used.

The polymeric particles can be sulfonated to create a negative charge at least on the surface of the particle. For example, particles made with 45% DVB and 55% EVB can be sulfonated by treating the particles with glacial acetic acid and concentrated sulfuric acid.

Figure 4:
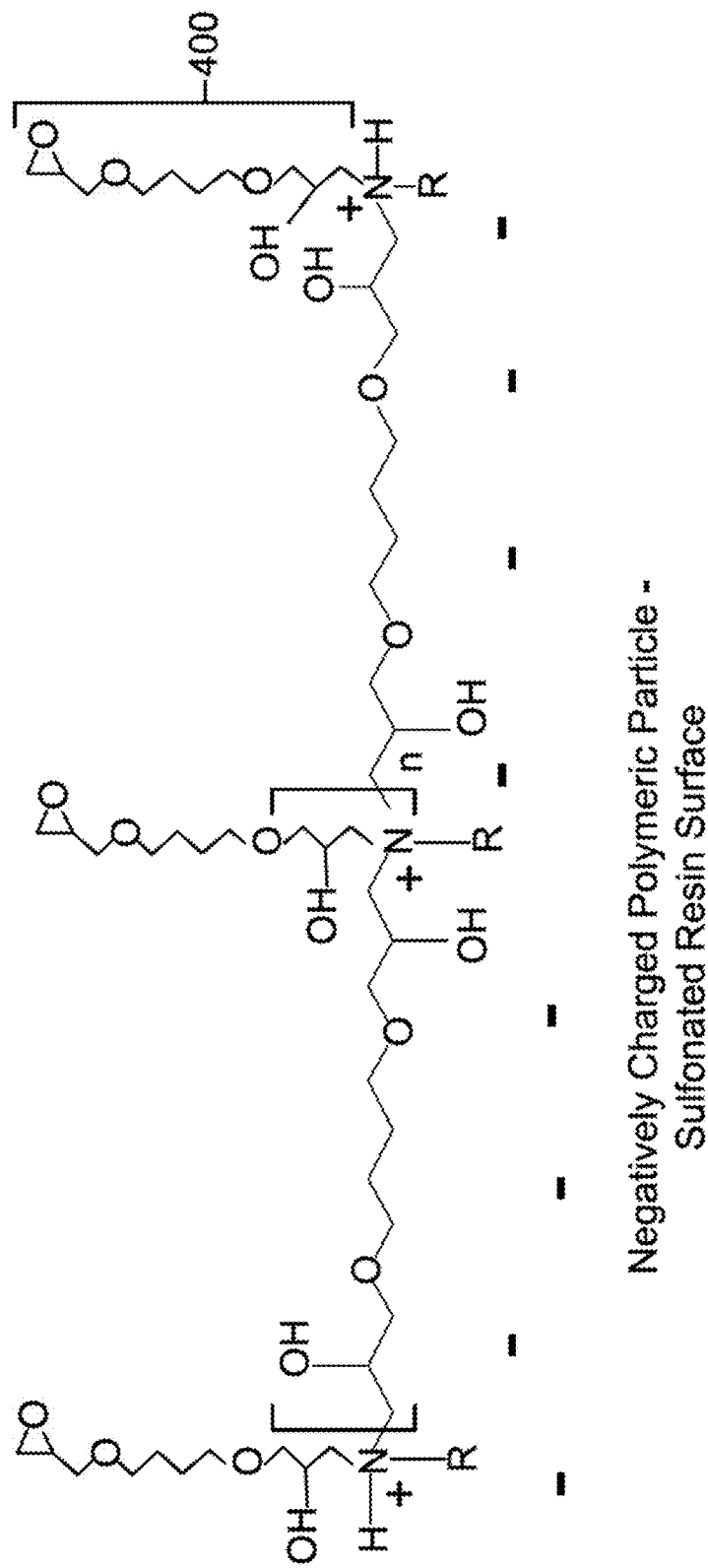
FIG. 4 illustrates a schematic of the condensation polymer that has reacted with another alkyldiol diglycidyl ether to form pendant epoxide groups.
Figure 5:
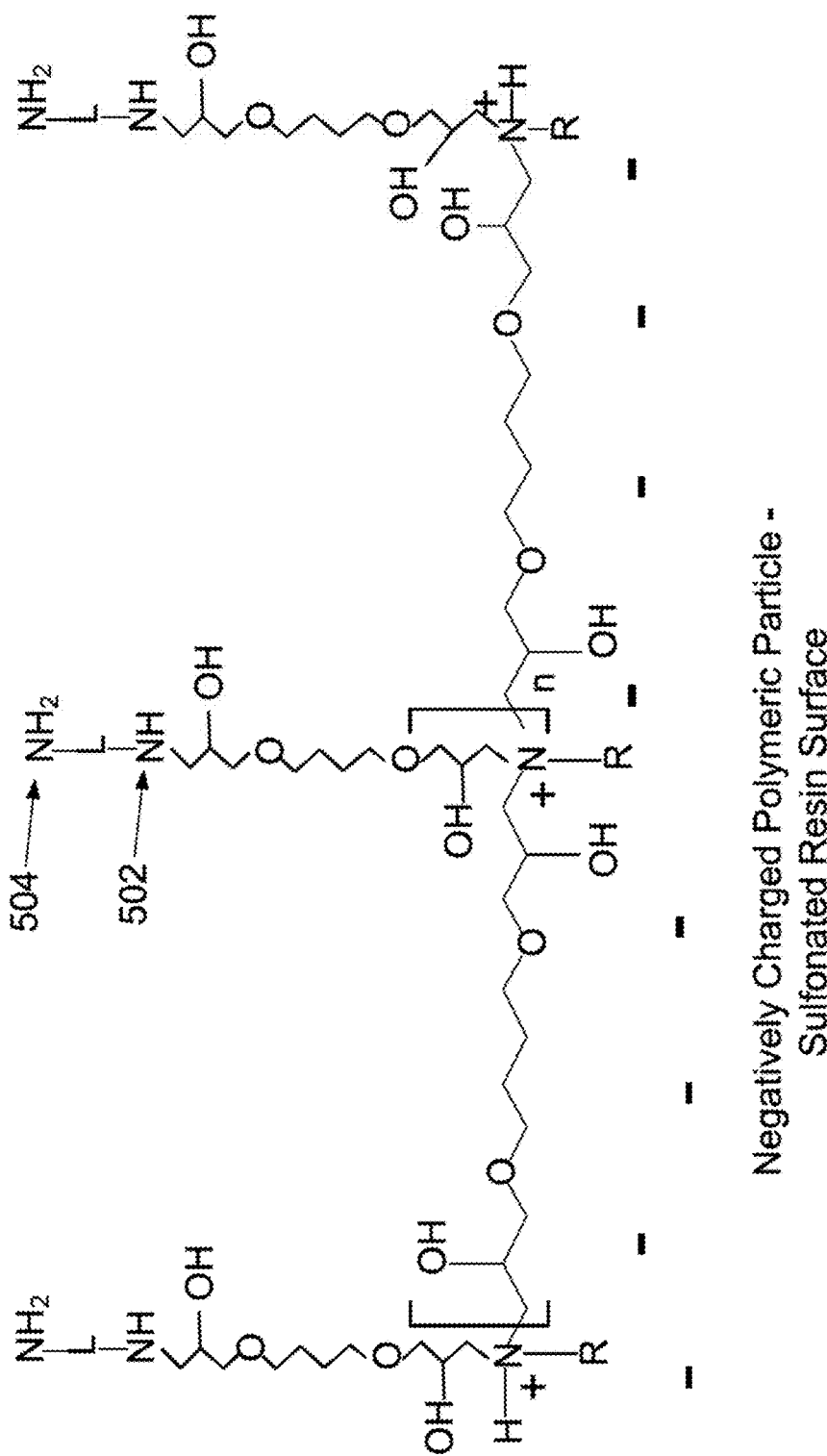
FIG. 5 illustrates a schematic of the condensation polymer where the pendant epoxide groups have reacted with diprimary diamines to form secondary amine groups and pendant primary amine groups.

Referring back to FIG. 3, base layer 300 can be reacted with two cycles of two treatment steps, which are a first step a) of an alkyldiol diglycidyl ether and then a second step b) of a diprimary diamine compound to form a first ion exchange resin. The first embodiment of the ion exchange resin is used interchangeably with the term first ion exchange resin. For a first step a) of a first cycle, another alkyldiol diglycidyl ether can be reacted with base layer 300 to form a second polymer layer 400 having pendant epoxide groups, as illustrated in FIG. 4. In addition, the tertiary amines of base layer 300 are converted to quaternary amines that have a positive charge. It is worthwhile to note that such positive charges are believed to help base layer 300 to ionically bond to the negatively charged particles. For a second step b) of the first cycle, the pendant epoxide groups can be reacted with another diprimary diamine compound to form a secondary amine 502 and a pendant amine compound 504, as illustrated in FIG. 5.

Referring to FIGS. 2-7, 9-11, R may be an alkyl group such as, for example, methyl. The term n may be value ranging from about 5 to 150. The term L represents a spacer in between two primary amines of the diprimary diamine. The spacer L may be substituted alkyl, unsubstituted alkyl, substituted heteroalkyl, unsubstituted heteroalkyl, substituted aryl, unsubstituted aryl, substituted heteroaryl, unsubstituted heteroaryl, substituted heterocycloalkyl, unsubstituted heterocycloalkyl, and a combination thereof. The spacer may include multiple units of ethylene oxide such as —($CH_2$—$CH_2$—O—)$_x$ where x ranges from 1 to 50. In addition, the spacer may include homoalkyl chains ranging from $C_2$ to $C_8$. Examples of diprimary diamines may include diaminotriethylene glycol 106, diaminobutane 108, lysine, diaminoethane, diaminopropane, diaminopentane, diaminocyclohexane, and diaminohexane.

Figure 6:
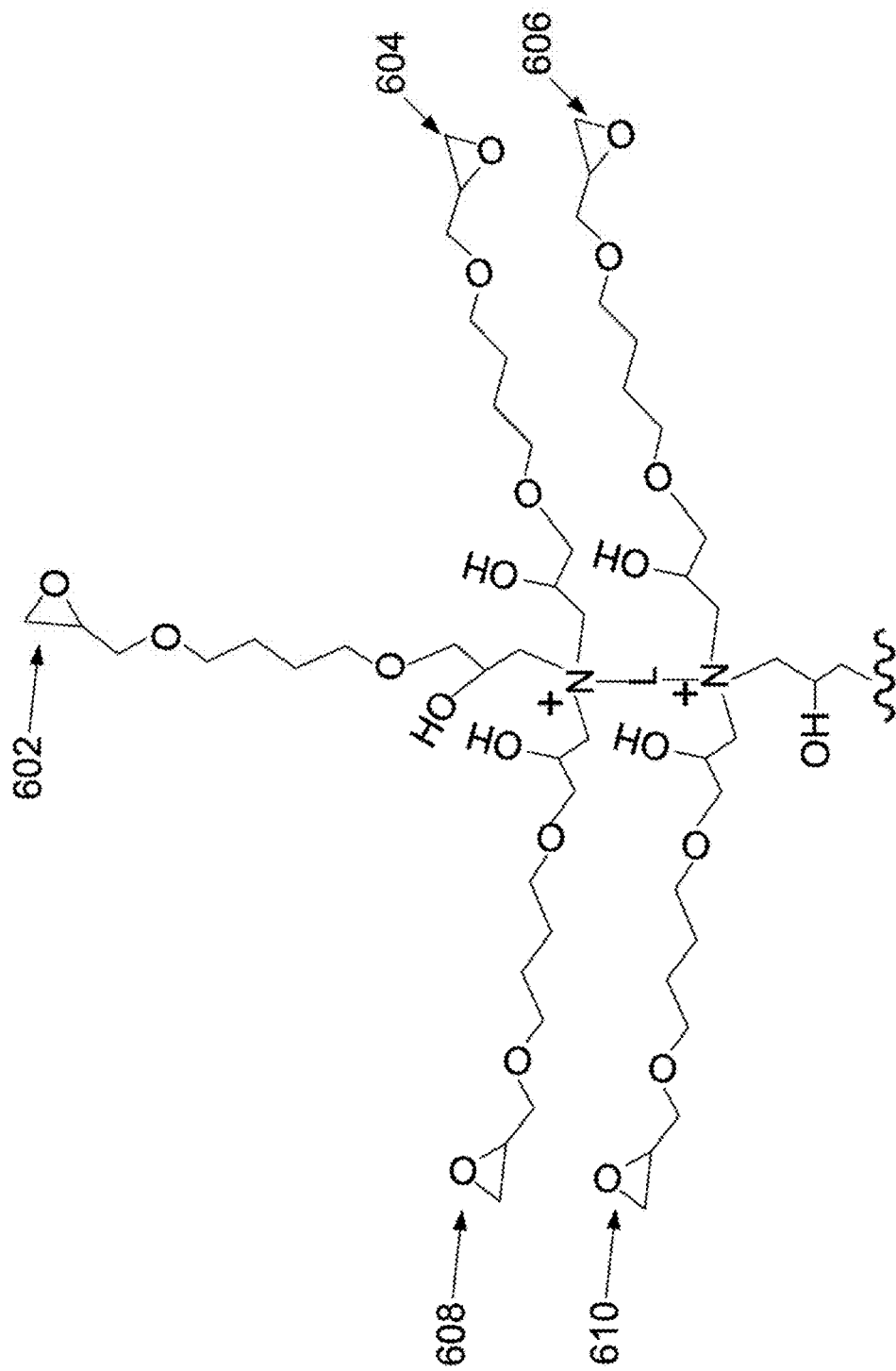
FIG. 6 illustrates a simplified portion of the condensation polymer where the secondary amine group and the pendant amine group have reacted with alkyldiol diglycidyl ether to form a branch of five pendant epoxide groups.
Figure 7:
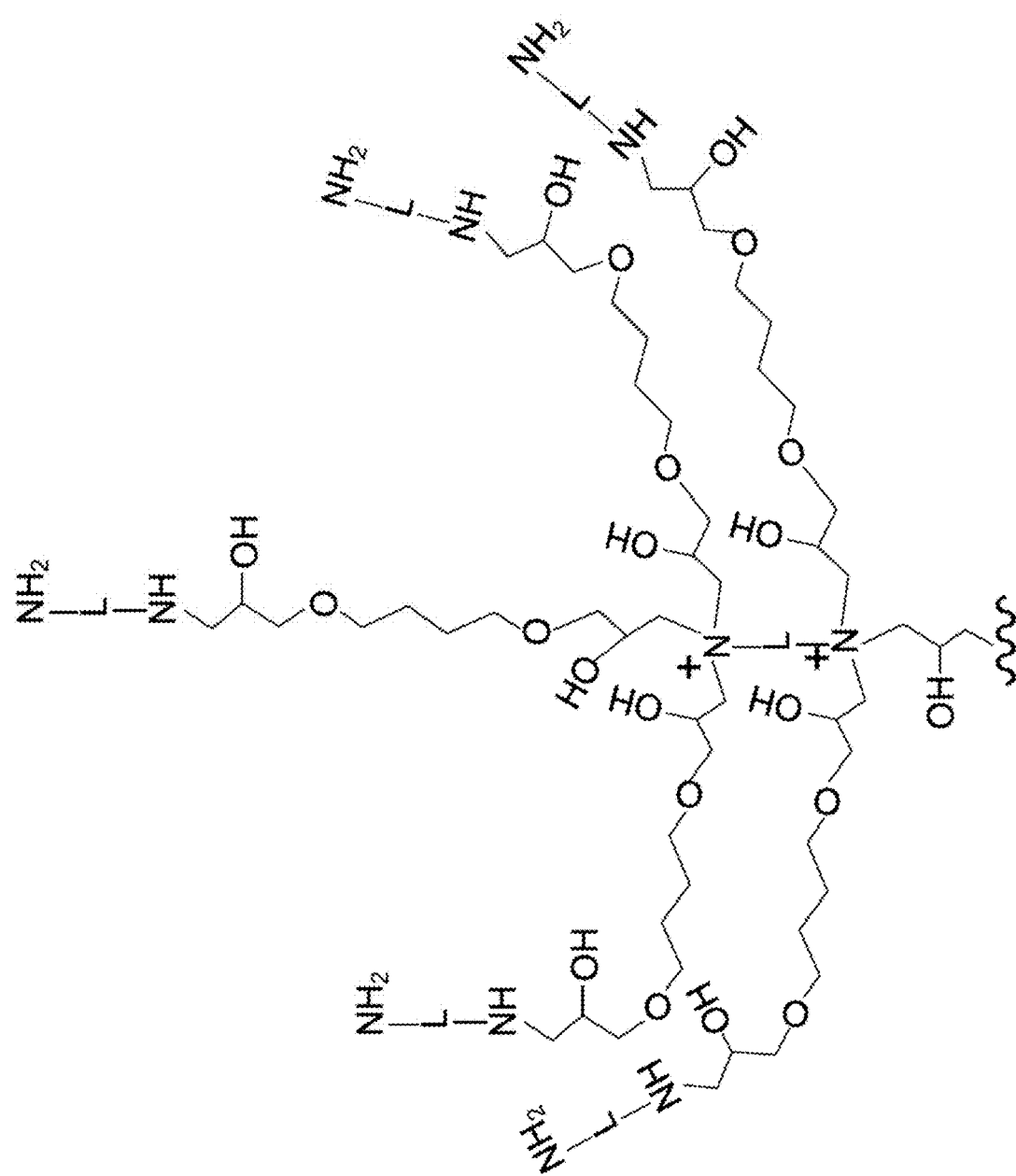
FIG. 7 illustrates a simplified portion of the condensation polymer where the five pendant epoxide groups have reacted with diprimary diamine groups to form a branch of five secondary amines and five pendant primary amine groups.

Now that one cycle of two steps has been performed for the first ion exchange resin, a second cycle of two steps may be performed to create a hyperbranched structure. For a first step a) of a second cycle, the pendant amine compound 504 and the secondary amine compound 502 can be reacted with up to three alkyldiol diglycidyl ethers and two alkyldiol diglycidyl ethers, respectively. Thus, up to five pendant epoxides can be formed for each diamine group during first step a) of the second cycle, as illustrated in FIG. 6. In addition, the primary and secondary amines (504 and 502) are both converted to quaternary amines that each have a positive charge. For a second step b) of the second cycle, the pendant epoxide groups 602, 604, 606, 608, and 610 can then be reacted with up to five diprimary diamines to form five branches that each has a pendant primary amine along with a secondary amine, as illustrated in FIG. 7.

In another embodiment, more than two cycles of the above noted two treatment steps of a) alkyldiol diglycidyl ether and b) diprimary diamine can be implemented to generate a more hyperbranched polymer structure with a higher amount of amine based anion exchange groups. Additional cycles of treatment may be needed for applications where the capacity may need to be adjusted.

A first ion exchange stationary phase can be prepared with a base layer of 1,4-butanediol diglycidyl ether and methyl amine, followed by two cycles of the above noted two treatment steps of a) 1,4-butanediol diglycidyl ether and b) diaminotriethylene glycol, in accordance with FIGS. 3-7. For the case of the first ion exchange resin, it should be noted that the squiggle in FIGS. 6 and 7 can represent adjacent chemical moieties such as, for example, the first and second polymer layers (300 and 400). This first ion exchange stationary phase can be packed into a column and used to perform ion exchange chromatography with hydroxide eluent to separate a sample containing various anions, as illustrated in FIGS. 8A-8E. Polyvalent anions can bind more strongly to the first anion exchange stationary phase compared to monovalent anions because of electrostatic interactions. As a result, this first ion exchange stationary phase can require a significantly longer amount of time and/or higher eluent concentration to elute polyvalent ions than monovalent ions. For example, pyrophosphate and phytate, which are both polyvalent would elute with a retention time much greater than 30 minutes using a 20 mM KOH eluent concentration with the first ion exchange resin. Thus, the analysis of samples containing both polyvalent and monovalent ions is not convenient because of the length of the test time, need for higher eluent concentration, and/or need to use a gradient elution. Applicant believes that there is a need for ion exchange phases that can adjust the retention time of polyvalent anions so that both monovalent and polyvalent anions can be separated in one relatively short chromatographic run (e.g., less than 30 minutes).

Applicant surprisingly found that modifying the first ion exchange stationary phase by replacing the primary amine in the base layer with a diprimary diamine resulted in a second ion exchange stationary phase with an improved capability of separating a sample with both monovalent and polyvalent anions in one relatively short chromatographic run. The use of diprimary diamine in the base layer resulted in a material that could adjust the retention time of polyvalent ions to a shorter time by relatively small increases in the eluent concentration. The second embodiment of the ion exchange resin is used interchangeably with the term second ion exchange resin.

The following will describe the second ion exchange stationary phase using a diprimary diamine with both the base layer and subsequent cycles of treatment. The ground or base polymer layer can be formed on a substrate by reacting diprimary diamines with alkyldiol diglycidyl ethers.

Figure 9:
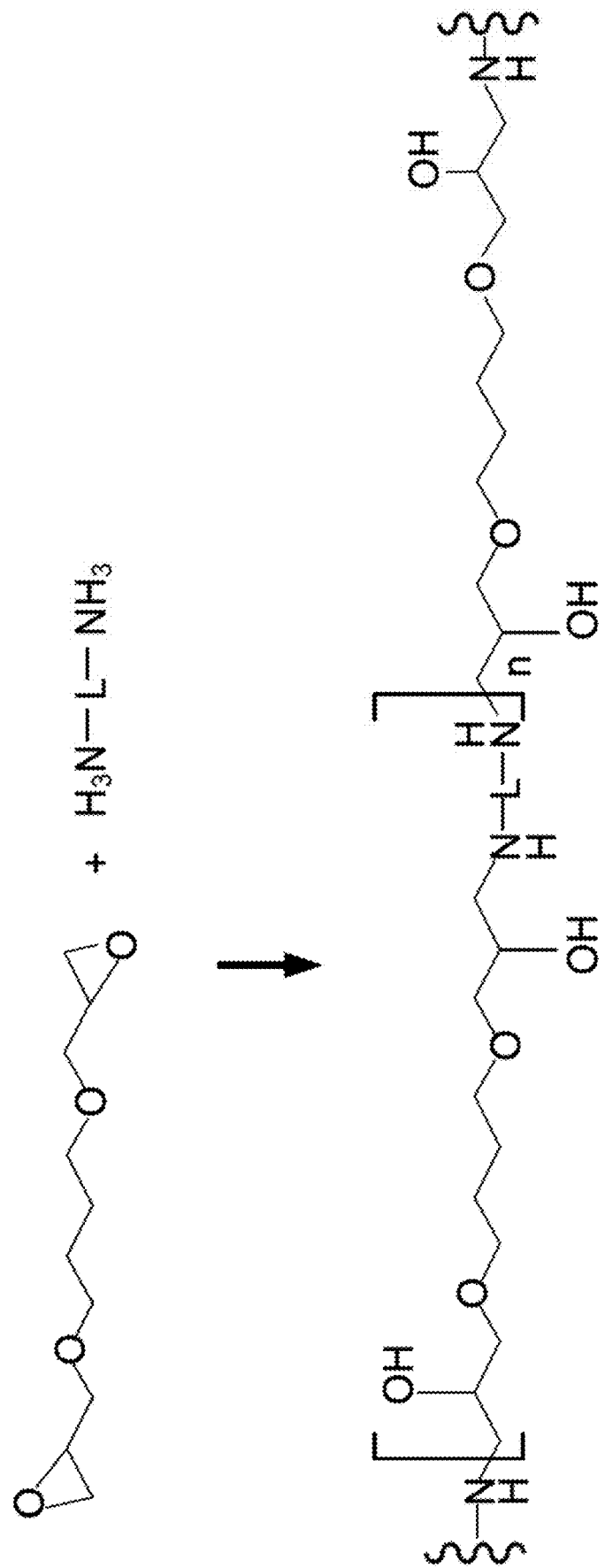
FIG. 9 illustrates a schematic of an alkyldiol diglycidyl ether reacting with a diprimary diamine to form a condensation polymer.

For example, a diprimary amine and an alkyldiol diglycidyl ether can include a diaminotriethylene glycol 106 and a 1,4-butanediol diglycidyl ether 102 (see FIGS. 1 and 9). In an aspect, the mole ratio can range between 1.5:1 and 2:1 (diprimary diamine:alkyldiol diglycidyl ether). In another aspect, the mole ratio can range be about 1:1 (diprimary diamine:alkyldiol diglycidyl ether). Although the base polymer layer 900 is depicted as linear in FIG. 9, it is possible for some of the amine groups to be quaternized and form either a branched or crosslinked portions. The base layer 900 can be formed in the presence of a negatively charged polymeric particle where the base layer associates and/or partially binds with the negatively charged polymeric particle. In contrast to base layer 300 that used a primary monoamine, base layer 900 will have a high proportion of secondary amines that can react with more than one epoxide functionality. As a result, diepoxide treatment of base layer 900 can result in a higher concentration of pendant epoxide groups and/or more crosslinking between linear polymers than base layer 300.

Figure 10:
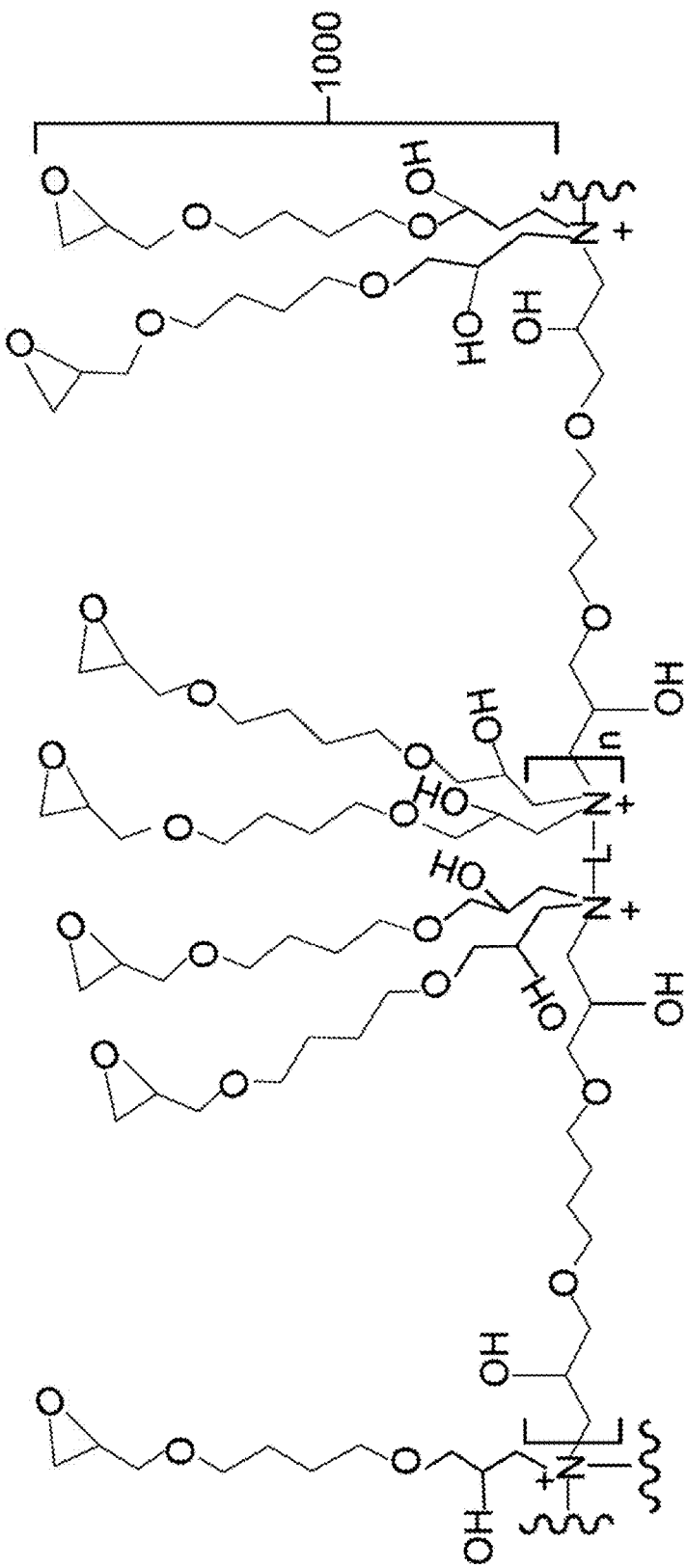
FIG. 10 illustrates a schematic of the condensation polymer that has reacted with alkyldiol diglycidyl ether to form pendant epoxide groups.
Figure 11:
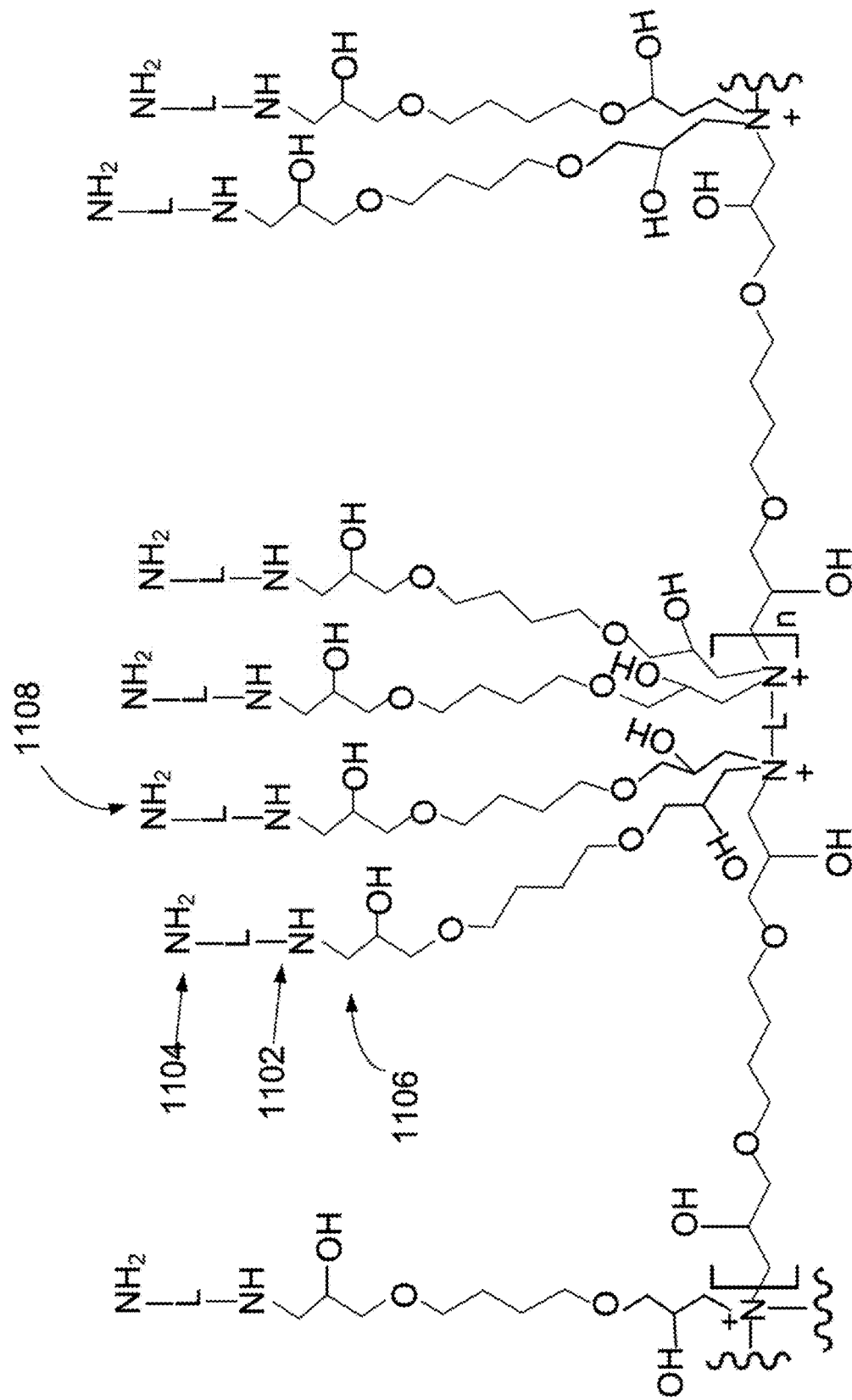
FIG. 11 illustrates a schematic of the condensation polymer where the pendant epoxide groups have reacted with diprimary diamines to form secondary amine groups and pendant primary amine groups.

Similar to the first ion exchange stationary phase, base layer 900 can be reacted with two cycles of two treatment steps, which are a first step a) of an alkyldiol diglycidyl ether and then a second step b) of a diprimary diamine compound. For the first step a) of a first cycle, another alkyldiol diglycidyl ether can be reacted with base layer 900 to form a second polymer layer 1000 having pendant epoxide groups, as illustrated in FIG. 10. In addition, quaternary amines are formed when two alkyldiol diglycidyl ethers are reacted with the secondary amines. It is worthwhile to note that such positive charges are believed to help base layer 900 to ionically bond to the negatively charged particles. Although the treatment with alkyldiol diglycidyl ether can result in two pendant epoxide groups, a portion of the diepoxides can form a crosslinking reaction between linear polymer chains or within one linear polymer chain. For a second step b) of the first cycle, the pendant epoxide groups can be reacted with another diprimary diamine compound to form a secondary amine 1102 and a pendant amine compound 1104, as illustrated in FIG. 11. It should be noted that the squiggle in FIGS. 9-11 can represent a portion of a diamine or a bond with a diepoxide compound.

Now that one cycle of two steps has been performed for the second ion exchange resin, a second cycle of two steps may be performed to create a hyperbranched structure. The second cycle for the second ion exchange stationary phase is similar to the second cycle for the first ion exchange stationary phase. For a first step a) of a second cycle, the pendant amine compound 1104 and the secondary amine compound 1102 can be reacted with up to three alkyldiol diglycidyl ethers and two alkyldiol diglycidyl ethers, respectively. Thus, up to five pendant epoxides can be formed during first step a) of the second cycle, as illustrated in FIG. 6. In addition, the primary and secondary amines (1102 and 1104) are converted to quaternary amines that have a positive charge. For the case of the second ion exchange resin, it should be noted that the squiggle in FIGS. 6 and 7 can represent adjacent chemical moieties such as, for example, the first and second polymer layers (900 and 1000). For a second step b) of the second cycle, the pendant epoxide groups 602, 604, 606, 608, and 610 can then be reacted with up to five diprimary diamines to form five branches that each has a pendant primary amine along with a secondary amine, as illustrated in FIG. 7. Although FIG. 7 shows that all of the diepoxide groups reacted to form five pendant epoxide groups, there is a portion of the diepoxide groups that can crosslink amongst different branches (e.g., 1106 and 1108) and a portion of the diepoxide groups that can crosslink amongst the two amine groups (1102 and 1104) of the same branch 1106 (see FIG. 11 for reference).

More than two cycles of the above noted two treatment steps of a) alkyldiol diglycidyl ether and b) diprimary diamine can be implemented to generate a more hyperbranched polymer structure for the second embodiment of the ion exchange phase with a higher amount of amine based anion exchange groups. In an embodiment, the cycles of the above noted two treatment steps of a) alkyldiol diglycidyl ether and b) diprimary diamine can be implemented 3, 4, 5, 6, 7, 8, 9, and 10 times. Additional cycles of treatment may be needed for applications where the capacity may need to be adjusted.

Figure 12:
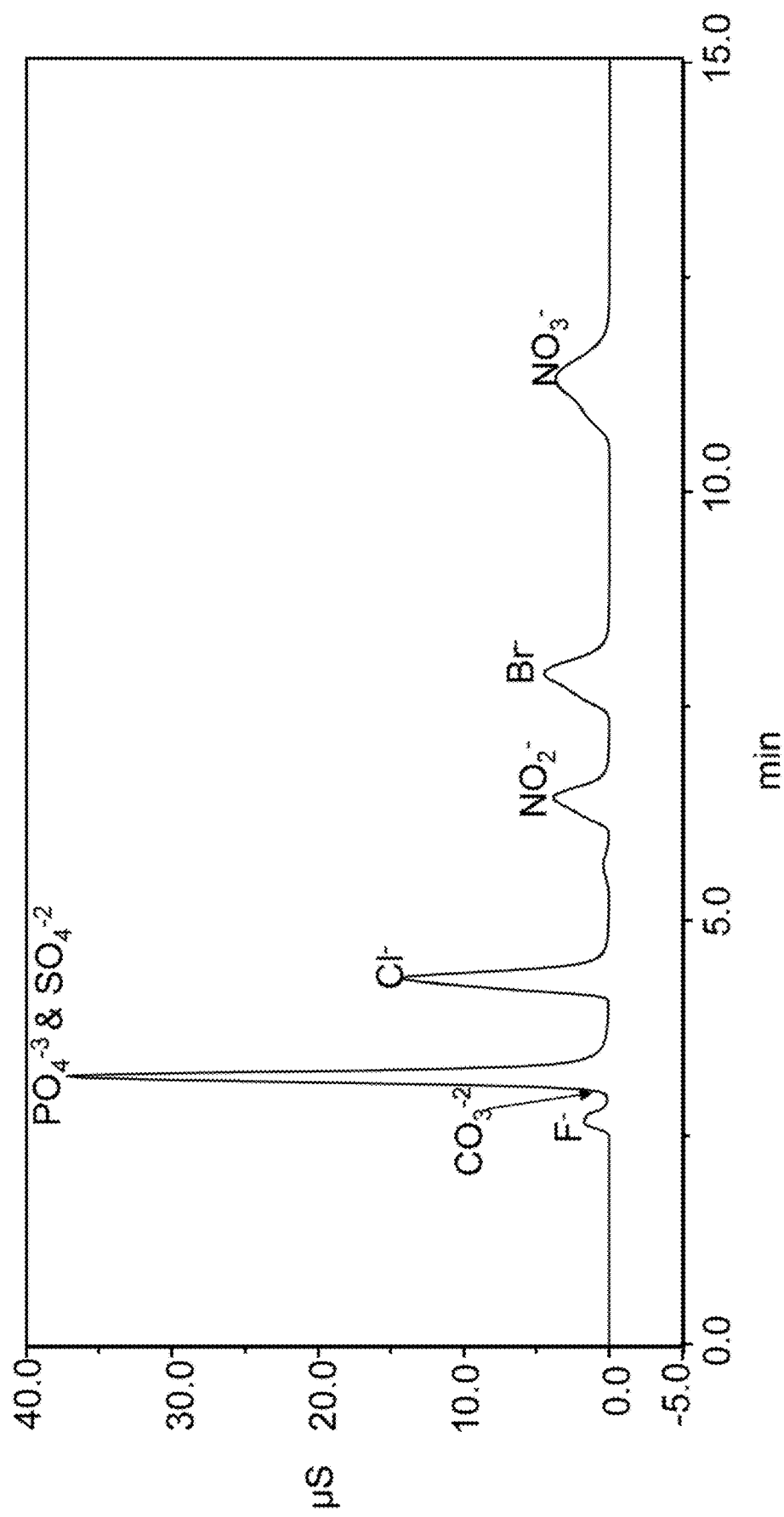
FIG. 12 illustrates a chromatogram of a standard solution containing monovalent and polyvalent anions using a second embodiment of an ion exchange resin having a base polymer layer of diaminotriethylene glycol and 1,4-butanediol diglycidyl ether that was subsequently treated with four cycles of a) 1,4-butanediol diglycidyl ether and b) diaminotriethylene glycol.

The second ion exchange stationary phase can be prepared with a base layer of 1,4-butanediol diglycidyl ether and diaminotriethylene glycol, followed by two cycles of the above noted two treatment steps of a) 1,4-butanediol diglycidyl ether and b) diaminotriethylene glycol, in accordance with FIGS. 9-11, and 6-7. This second ion exchange stationary phase can be packed into a column and used for performing ion exchange chromatography with a 10 mM hydroxide eluent to separate monovalent and polyvalent ions as illustrated in FIG. 12. For the second ion exchange stationary phase, polyvalent anions do not necessarily bind more strongly to the second anion exchange stationary phase compared to monovalent anions. It should be noted that the trivalent and divalent anions eluted relatively quickly with a relatively low eluent concentration of 10 mM which is 50% lower than the 20 mM eluent concentration used in FIG. 8A. As a result, this second ion exchange stationary phase can be used to separate both monovalent and polyvalent anions with relatively short analysis times by adjusting the eluent concentration. The fact that the basement layer was changed in the second ion exchange stationary phase and the basement layer is relatively buried underneath additional chemical treatments resulted in a surprising result in that this change influenced the binding of polyvalent anions. The second ion exchange resin was made with the combination of diprimary diamine and diglycidyl ether resulting in a highly crosslinked polymer that exhibited exceptionally low affinity for polyvalent species. It is hypothesized that the reason for this unusual selectivity is due to the fact that the ion exchange sites in the hyperbranched structure are highly constrained by numerous crosslinks to physical distances that are too far apart to allow energetically favorable interactions between polyvalent anions with multiple ion exchange sites.

Figure 13:
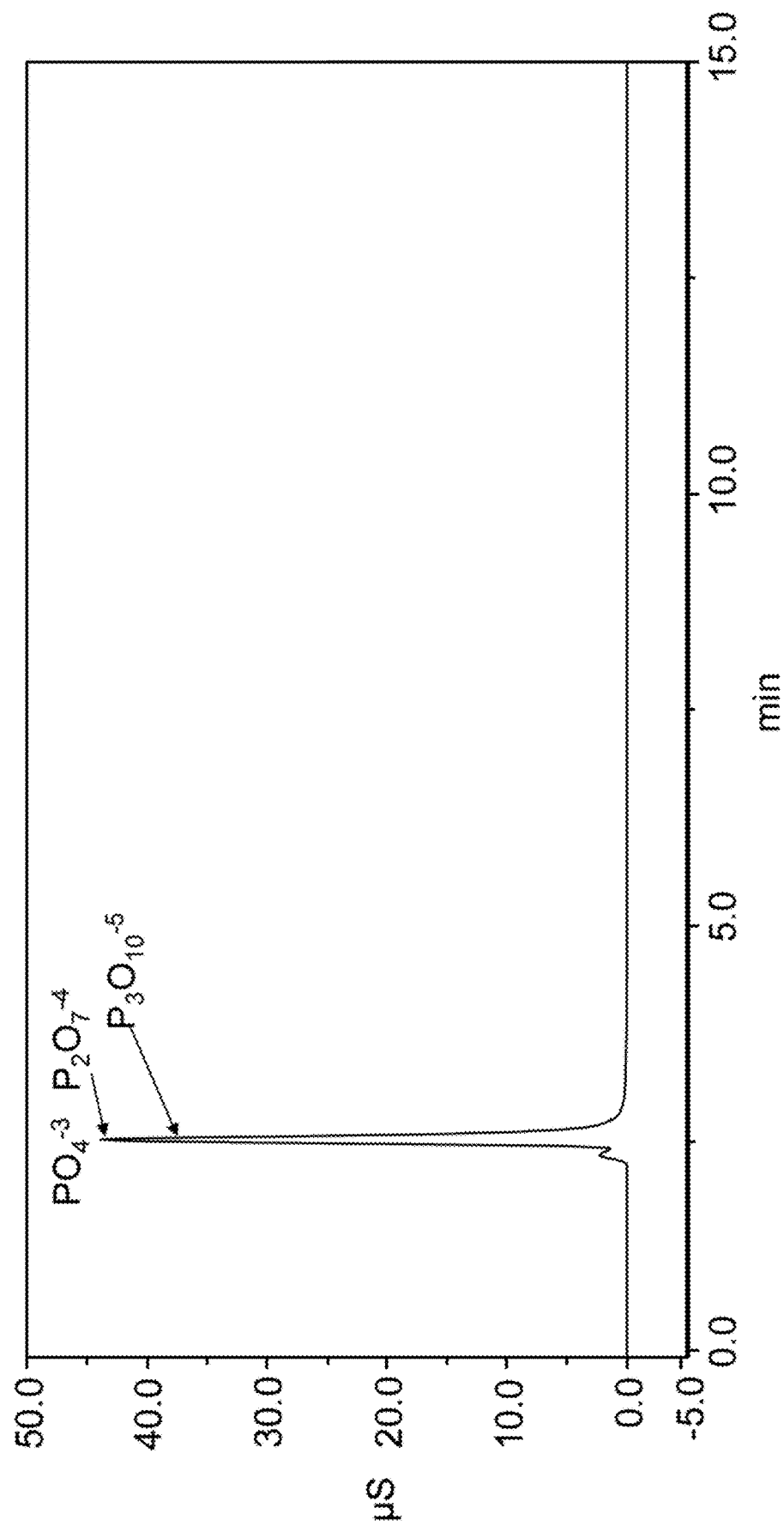
FIG. 13 illustrates a chromatogram of a standard solution containing polyvalent anions using the second embodiment of the ion exchange resin.

FIG. 13 illustrates a chromatogram of a standard solution containing polyvalent anions using the second ion exchange resin. The standard solution contained three negatively charged anions phosphate, pyrophosphate, and tripolyphosphate that respectively have a negative charge of −3, −4, and −5. It worthwhile to note that the negatively charged anions co-eluted relatively quickly with a relatively low eluent concentration of 20 mM KOH. The relatively low eluent concentration provides for a simpler lower cost test by reducing the amount of high purity chemicals needed for the eluent. In addition, a lower eluent concentration is easier to suppress with lower applied suppressor currents that can result in less background signal noise.

Figure 14:
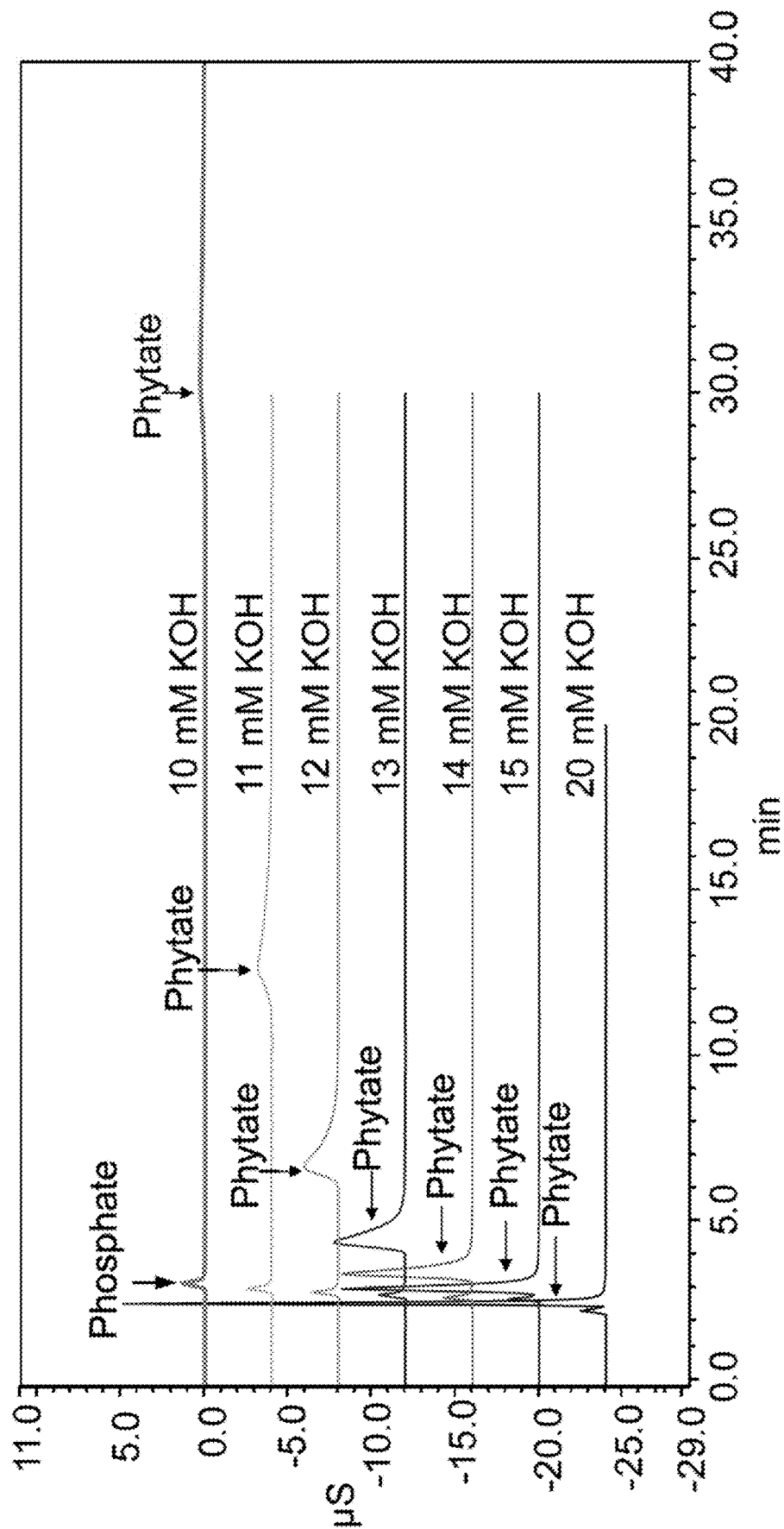
FIG. 14 illustrates a chromatogram of a sample containing polyvalent anions (phosphate and phytate) using the second embodiment of the ion exchange resin at various eluent concentrations.

FIG. 14 illustrates chromatograms of a standard solution containing phytate and phosphate using the second ion exchange resin at various eluent concentrations ranging from 10 to 20 mM KOH. Phytate is believed to have a −−12 negative charge and phosphate has a −3 charge under the test conditions. In general, the retention time for phytate is longer than the retention time for phosphate presumably due to the more negative charge of phytate. Applicant found that increasing the eluent concentration caused both the phosphate and phytate peak to shift to shorter retention times. However, the magnitude of this shift was much greater for phytate than phosphate. As the eluent concentration increased, the phytate peak retention time not only decreased, but the phytate peak moved closer to the phosphate peak. Thus, the retention time of a highly negatively charged anion such as phytate can be adjusted by a modest change in eluent concentration. In addition, shifting a polyvalent anion to shorter retention time causes the peak shape to become sharper improving peak resolution.

FIG. 15 illustrates a table showing the effect of KOH eluent concentrations on the peak retention time for various monovalent and polyvalent anions. The standard solution contained chloride (−1), nitrate (−1), phosphate (−3) and phytate (−12). The retention time for each of the anions tested shifted in response to a change in eluent concentration. The eluent concentration can be varied so that the particular anions of interest can be analyzed without peak overlap and/or to perform the measurement in a relatively short time frame (to increase sample testing throughput). Based on the table in FIG. 15, an eluent concentration between about 10-13 mM KOH provided the best separation of the 4 anions in the standard solution.

Figure 16:
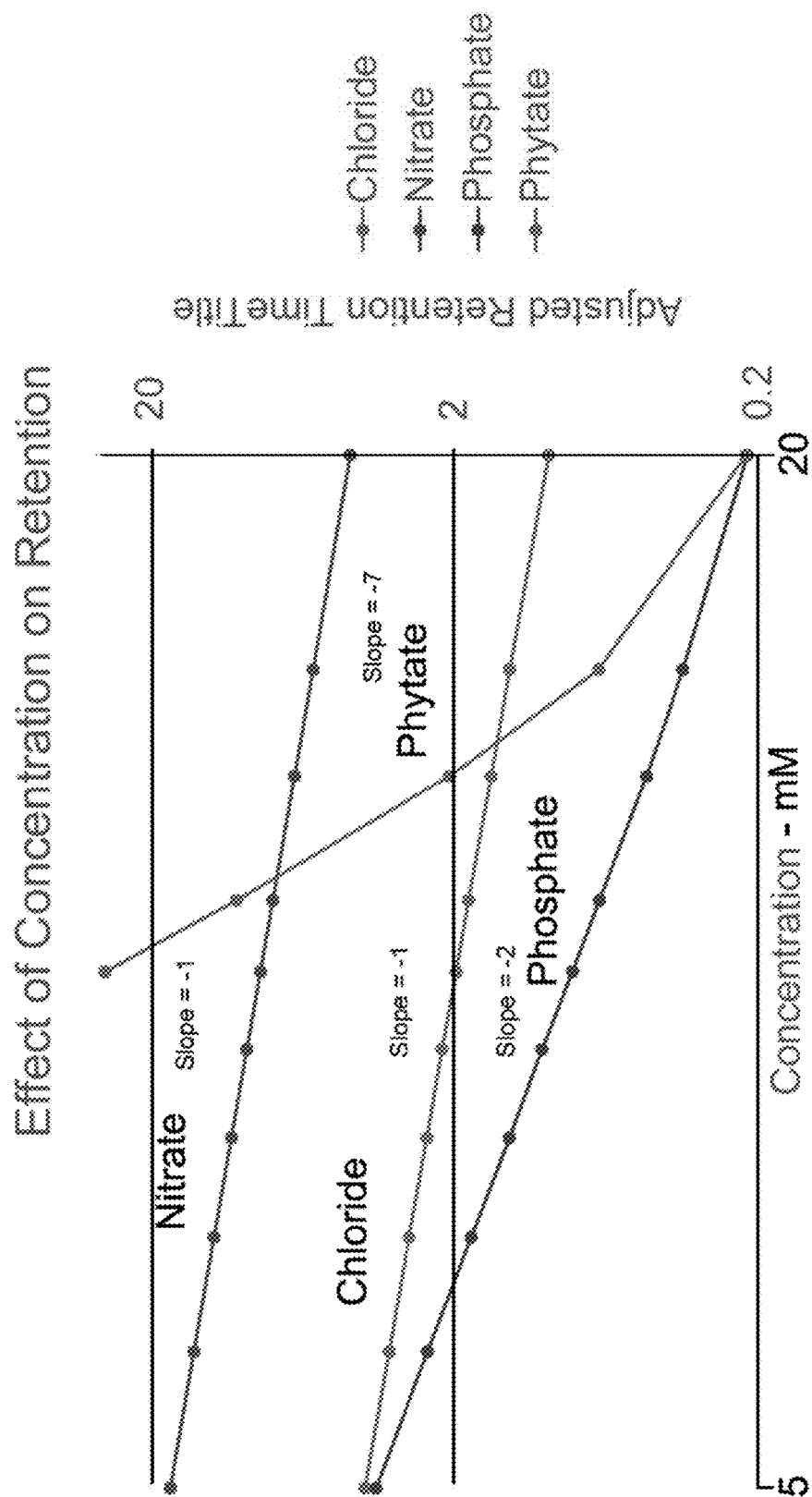
FIG. 16 is chart showing the effect of KOH eluent concentration on the peak retention time for various anions in a log-log plot.

FIG. 16 is chart showing the effect of KOH eluent concentration on the adjusted peak retention time for various anions in a log-log plot using the data from FIG. 15. The adjusted retention time is equal to the measured retention time minus the column void volume time. In general, the slopes of the lines approximately correlate with the negative charge state of the anions. Phytate shows a slope of −7 which is much less than the −12 charge. FIG. 16 shows that the absolute slope value is the largest for phytate relative to the other anions having a lower valent state.

Figure 17:
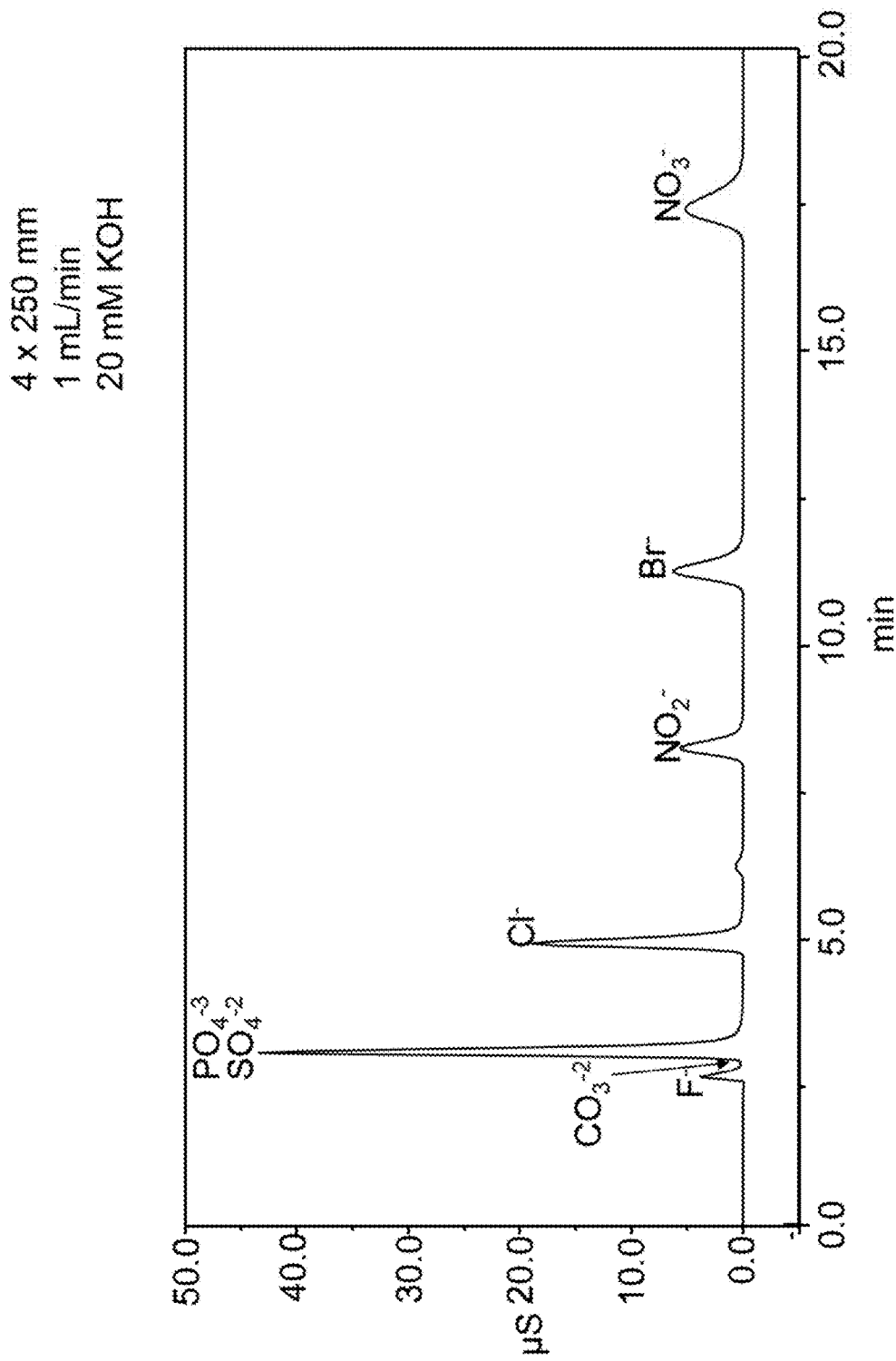
FIG. 17 illustrates a chromatogram of a standard solution containing monovalent and polyvalent anions using a third embodiment of an ion exchange resin having a base polymer layer of 1,4-diaminobutane and 1,4-butanediol diglycidyl ether that was subsequently treated with four cycles of a) 1,4-butanediol diglycidyl ether and b) 1,4-diaminobutane.

In an embodiment, a third ion exchange resin can be made in a manner similar to the second ion exchange resin except that the diaminotriethylene glycol is replaced with 1,4-diaminobutane. FIG. 17 illustrates a chromatogram of a standard solution containing monovalent and polyvalent anions using the third ion exchange resin. Similar to the second ion exchange resin, sulfate does not bind strongly to the third anion exchange resin compared to monovalent anions. The standard solution contained 1 ppm fluoride, 15 ppm sulfate, 15 ppm phosphate, 3 ppm chloride, 5 ppm nitrite, 10 ppm bromide, and 10 ppm nitrate. The phosphate ion coeluted with sulfate in about 3 minutes using a 20 mM KOH eluent. This is similar to the second ion exchange resin where phosphate eluted at about 2.5 minutes using 20 mM KOH (See FIG. 13).

Figure 18:
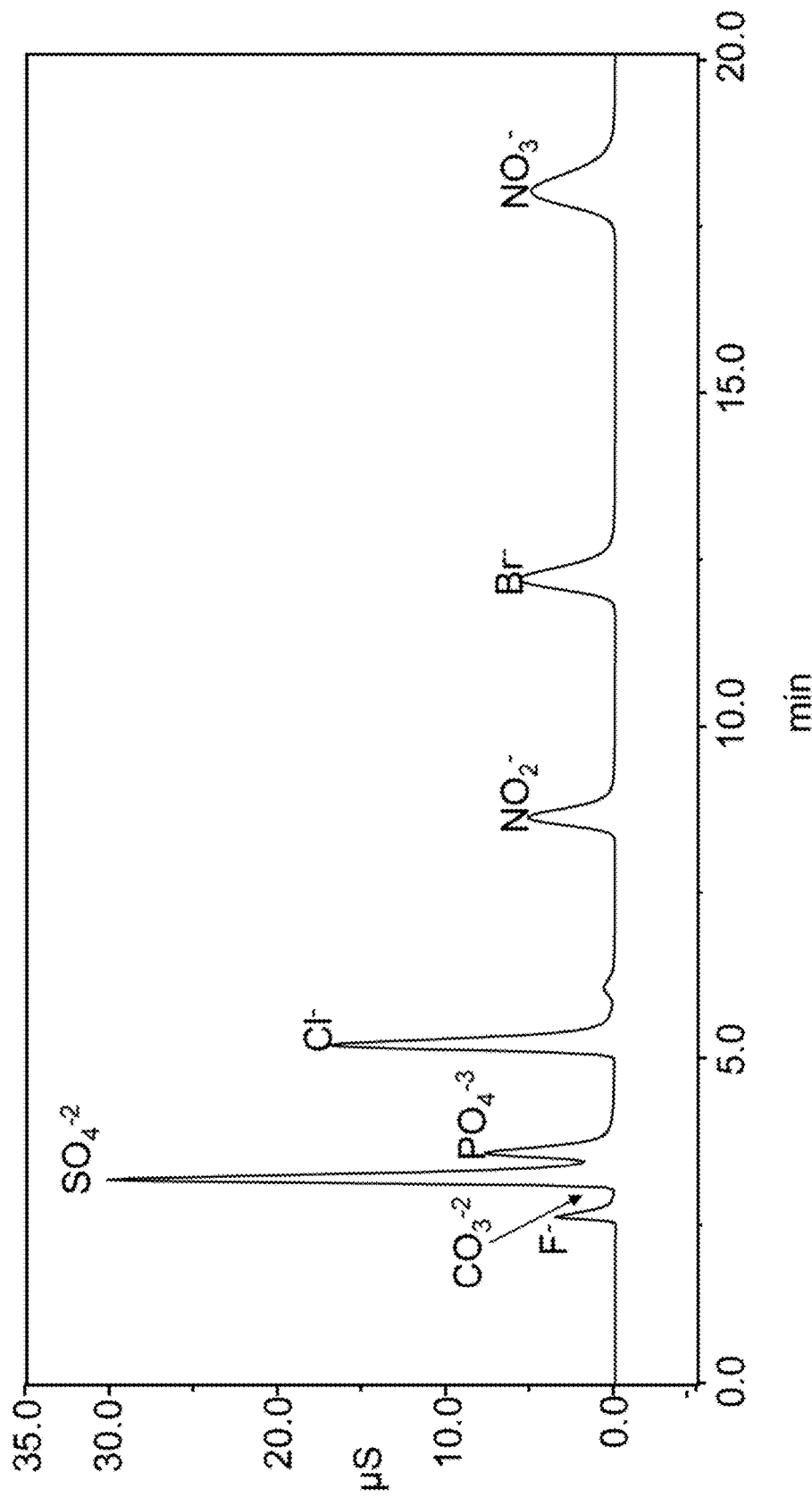
FIG. 18 illustrates a chromatogram of a standard solution containing monovalent and polyvalent anions using a fourth embodiment of an ion exchange resin, which is the third embodiment of the ion exchange resin treated with glycidol.

In another embodiment, the third ion exchange resin was treated with a glycidol solution to form the fourth ion exchange resin. The glycidol treatment caused the primary and secondary amines (as shown in FIG. 7) to become quaternary amines and also adds hydroxy groups. More information about glycidol treatment can be found in U.S. Pat. No. 9,486,799. FIG. 18 illustrates a chromatogram of a standard solution containing monovalent and polyvalent anions using the fourth ion exchange resin with the glycidol treatment. The standard solution contained 1 ppm fluoride, 15 ppm sulfate, 15 ppm phosphate, 3 ppm chloride, 5 ppm nitrite, 10 ppm bromide, and 10 ppm nitrate. In contrast to the third ion exchange resin which was not treated with glycidol (see FIG. 17), the phosphate peak elutes slightly later than the sulfate peak with the fourth ion exchange resin (see FIG. 18).

The fourth ion exchange resin which was treated with glycidol was tested with polyvalent ions. FIG. 19 illustrates a chromatogram of a standard solution containing polyvalent anions using the fourth ion exchange resin. The standard solution contained 20 ppm phosphate, 20 ppm pyrophosphate, and 20 ppm tripolyphosphate. In contrast to the second ion exchange resin (see FIG. 13), the peaks for phosphate ($PO_4^{3-}$), pyrophosphate ($P_2O_7^{4-}$, and tripolyphosphate ($P_3O_{10}^{5-}$) did not co-elute and were resolved from each other using the fourth ion exchange resin (see FIG. 19).

Example 1

Synthesis of the First Ion Exchange Resin with Primary Amine in Base Layer

A 4×250 mm (diameter×length) chromatography column was packed with 6.4 μm diameter particles with surface sulfonated 22 m²/g wide-pore resin (DVB/EVB). The basement layer was applied to a packed column by flowing butanediol diglycidyl ether-methylamine solution mixture (0.35 M with respect to butanediol diglycidyl ether: 0.36 M with respect to methylamine) at 0.5 mL/minute through the column at 70° C. for 90 minutes to form polymer 300 (see FIG. 3). Next, 4 cycles of reagent treatment were flowed at 0.5 mL/minute through the column. Each cycle of treatment included a first step a) 10% butanediol diglycidyl ether solution was flowed through the column for 10 minutes and then allowed to react at 70° C. for 20 minutes to form polymer layer 400, and a second step b) 1 M diaminotriethylene glycol solution was flowed through column for 10 minutes and then allowed to react at 70° C. for 20 minutes.

Example 2

Figure 8A:
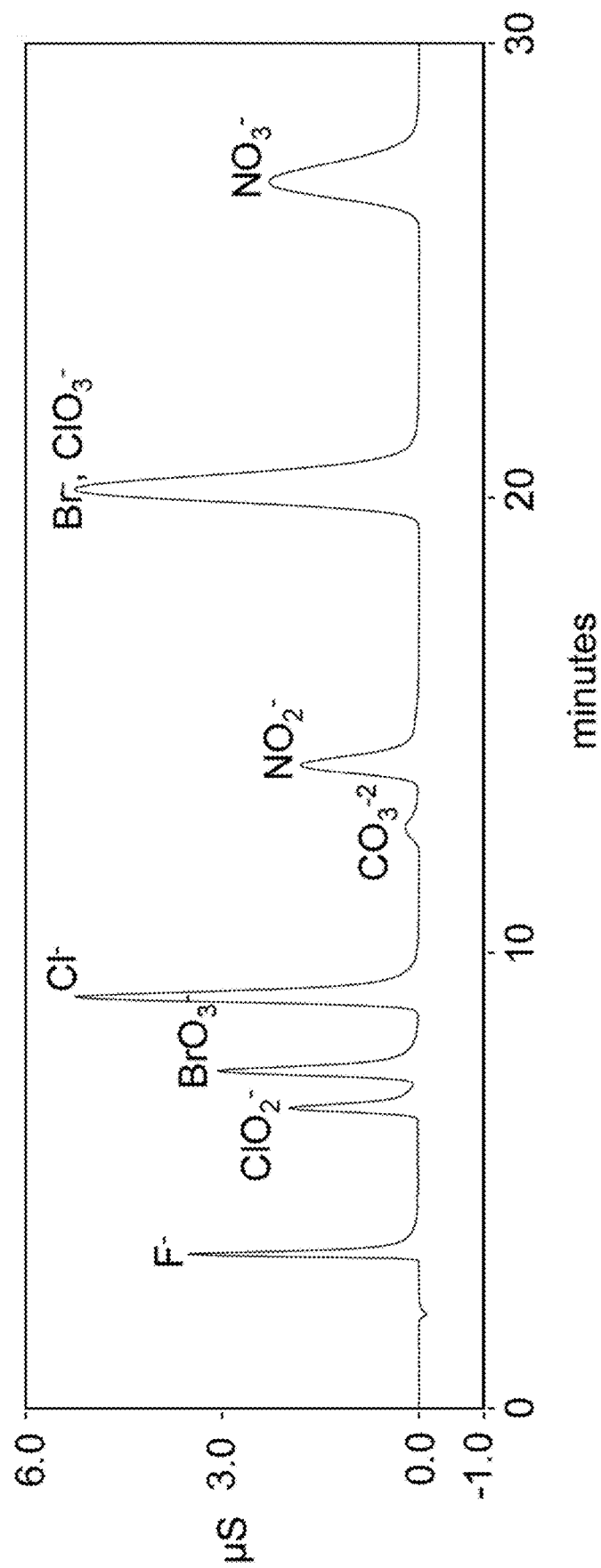
Figure 8B:
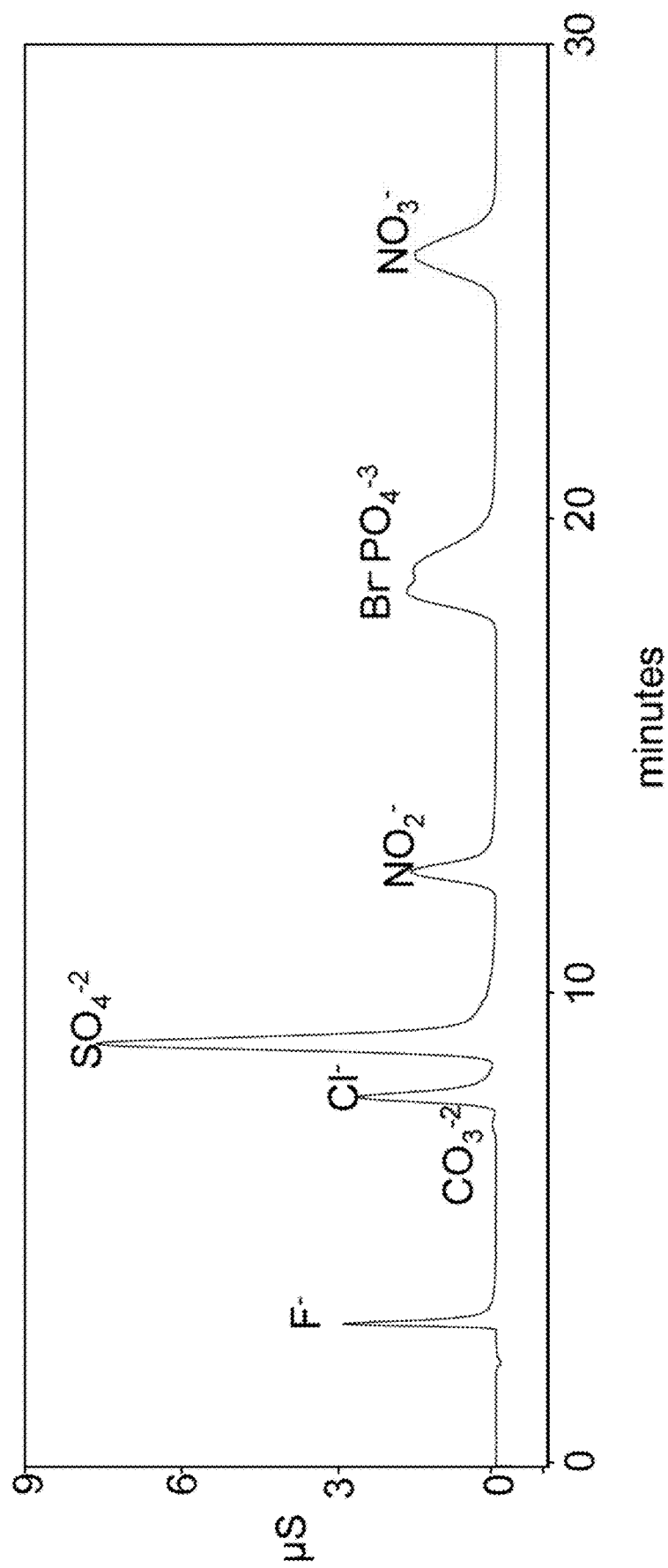
Figure 8C:
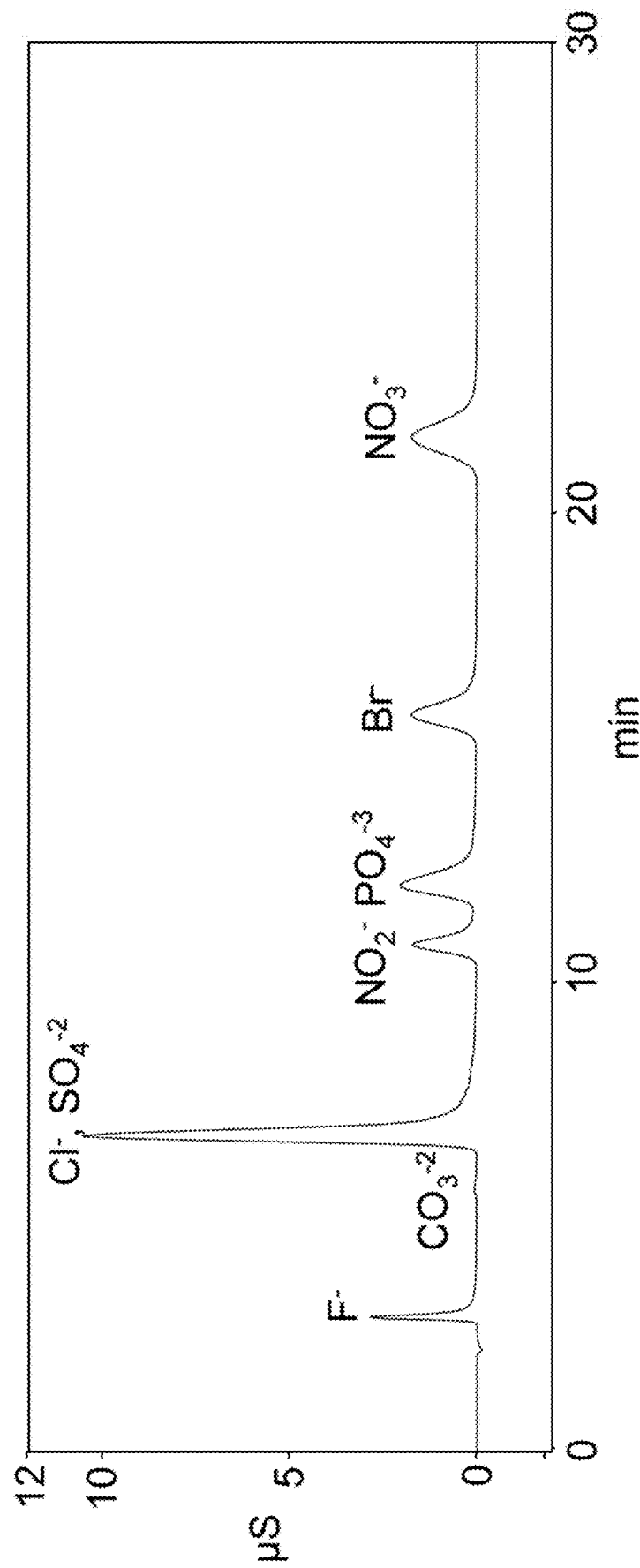
Figure 8E:
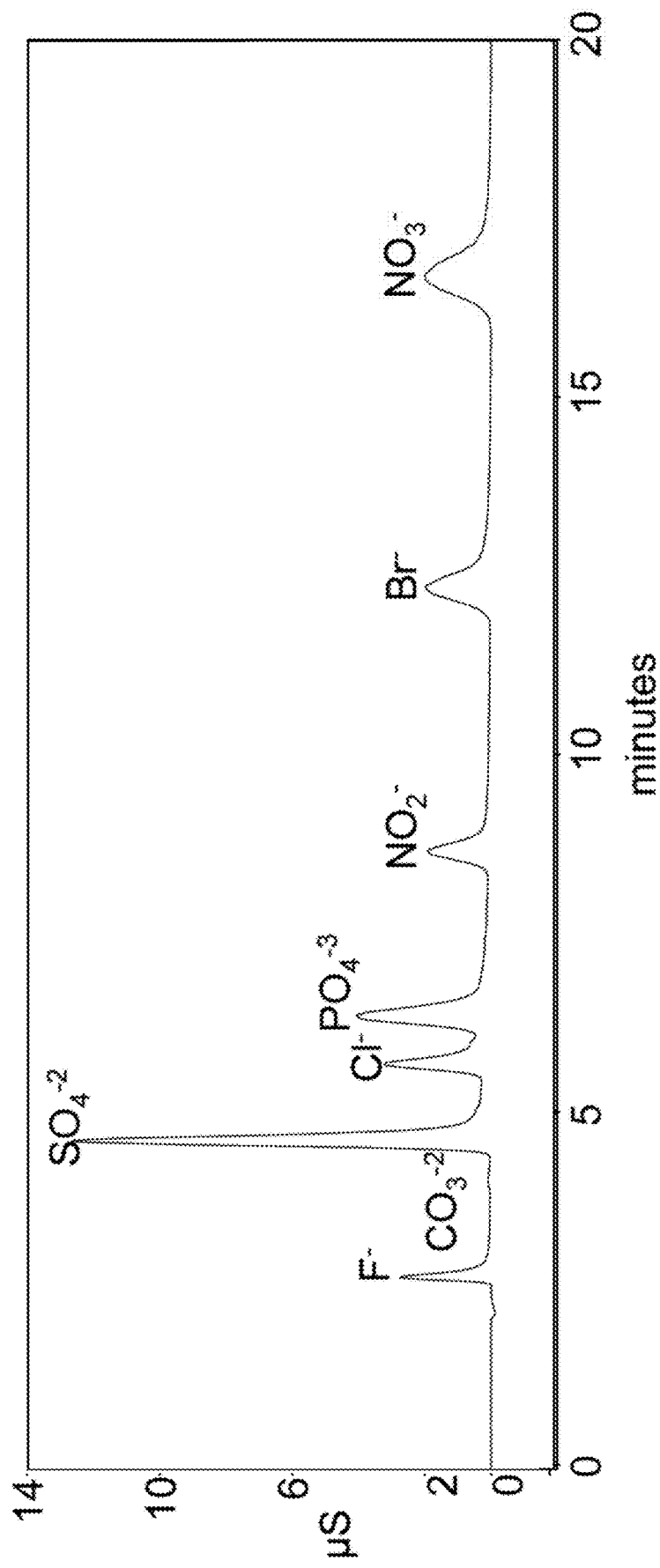

Chromatogram of Standard Solution Containing Monovalent Anions with the First Ion Exchange Resin The chromatography column of Example 1 was installed into an ion chromatography system (Thermo Scientific ICS-5000+ commercially available from Thermo Fisher Scientific, Sunnyvale, Calif.). A pump was used to pump deionized water at a flow rate of about 1 mL/min. A Thermo Scientific Dionex capillary EGC 500 KOH cartridge (Thermo Fisher Scientific, Sunnyvale, Calif.) was used for generating a 20 to 40 mM KOH eluent. A 25 μL injection volume of an anion standard solution was injected into an injection valve. A column heater was used to maintain a column temperature of 30° C. A Dionex 4 mm AERS 500 suppressor was used at 50 mA along with a Thermo Scientific conductivity detector. An initial chromatograms as run using the first ion exchange resin with an eight anion standard solution that contained 1 ppm fluoride, 5 ppm chlorite, 10 ppm bromate, 3 ppm chloride, 5 ppm nitrite, 10 ppm bromide, 10 ppm chlorate, and 10 ppm nitrate, as illustrated in FIG. 8A. Next, a series of chromatograms were run using the first ion exchange resin with a seven anion standard solution that contained 1 ppm fluoride, 15 ppm sulfate, 15 ppm phosphate, 3 ppm chloride, 5 ppm nitrite, 10 ppm bromide, and 10 ppm nitrate, as illustrated in FIGS. 8B to 8E. Carbonate was present in the standard solution from the atmosphere. For the chromatograms in FIGS. 8A, 8B, 8C, 8D, and 8E, the eluent concentration was tested at 20, 25, 30, 35, and 40 mM KOH, respectively.

Example 3

Synthesis of the Second Ion Exchange Resin with Diprimary Diamine in Base Layer A 4×250 mm (diameter×length) chromatography column was packed with 6.4 μm diameter particles with surface sulfonated 22 m²/g wide-pore resin (DVB/EVB). The basement layer was applied to a packed column by flowing butanediol diglycidyl ether-diaminotriethyleneglycol solution mixture (0.35 M with respect to butanediol diglycidyl ether: 0.36 M with respect to diaminotriethyleneglycol) at 0.5 mL/minute through the column at 70° C. for 10 minutes, and then allowed to react at 70° C. for 50 minutes. Next, 4 cycles of reagent treatment were flowed at 0.5 mL/minute through the column. Each cycle of treatment included a first step a) 10% butanediol diglycidyl ether solution was flowed through the column for 10 minutes and then allowed to react at 70° C. for 20 minutes, and a second step b) 1 M diaminotriethylene glycol solution was flowed through column for 10 minutes and then allowed to react at 70° C. for 20 minutes.

Example 4

Chromatogram of Monovalent and Polyvalent Anion Standard Solution with the Second Ion Exchange Resin The chromatography column of Example 3 was installed into an ion chromatography system (Thermo Scientific ICS-5000+ commercially available from Thermo Fisher Scientific, Sunnyvale, Calif.). A pump was used to pump deionized water at a flow rate of about 1 mL/min. A Thermo Scientific Dionex capillary EGC 500 KOH cartridge (Thermo Fisher Scientific, Sunnyvale, Calif.) was used for generating a 10 mM KOH eluent. A 25 μL injection volume of an anion standard solution was injected into an injection valve. A column heater was used to maintain a column temperature of 30° C. A series of chromatograms were run using the second ion exchange resin with a seven anion standard solution that contained 1 ppm fluoride, 15 ppm sulfate, 15 ppm phosphate, 3 ppm chloride, 5 ppm nitrite, 10 ppm bromide, and 10 ppm nitrate, as illustrated in FIG. 12. Carbonate was present in the standard solution from the atmosphere. A Dionex 4 mm AERS 500 suppressor was used at 25 mA along with a Thermo Scientific conductivity detector.

Example 5

Chromatogram of Polyvalent Anion Standard Solution with the Second Ion Exchange Resin An ion chromatography system similar to Example 4 was used with similar conditions and standard solution except for the following. The KOH eluent concentration was increased to 20 mM and the suppressor current was increased to 50 mA. A chromatogram was run using the second ion exchange resin with a three anion standard solution that contained 20 ppm phosphate, 20 ppm pyrophosphate, and 20 ppm tripolyphosphate, as illustrated in FIG. 13. Carbonate was present in the standard solution from the atmosphere.

Example 6

Chromatogram of a Standard Solution Containing Phosphate and Phytate with the Second Ion Exchange Resin An ion chromatography system similar to Example 4 was used with similar conditions except for the following. A series of chromatograms were run using the second ion exchange resin with a two anion standard solution that contained 2 ppm phosphate and 40 ppm phytate, as illustrated in FIG. 14. For each chromatogram shown in FIG. 14, the KOH eluent concentration was tested at one of 10, 11, 12, 13, 14, 15, and 20 mM KOH and the suppressor current was respectively adjusted to a value between 25 mA to 50 mA.

Example 7

Chromatographic Separation of a Standard Solution Containing Polyvalent Anions with the Second Ion Exchange Resin where the Eluent Concentration was Varied from 5 to 20 mM KOH An ion chromatography system similar to Example 6 was used with similar conditions except for the following. A four anion standard solution was used that contained 3 ppm chloride, 10 ppm nitrate, 15 ppm phosphate, and 30 ppm phytate. One chromatogram was performed with the standard solution for each of the following KOH eluent concentration, which were 5, 6, 7, 8, 9, 10, 11, 13, 15, and 20 mM. For each chromatogram, the retention time for the anions were recorded at each eluent concentration, as shown in a table of FIG. 15.

Example 8

Synthesis of the Third Ion Exchange Resin with Diaminobutane in Base Layer 5.4 grams of 6.4 μm diameter particles with surface sulfonated 22 m²/g wide-pore resin (DVB/EVB) was mixed with 2.5 grams $H_2O$, 0.618 g butanediol diglycidyl ether and 4.1 g of 1 M 1,4-diaminobutane in a vial. The vial was submersed in a water bath and reacted at 70° C. for 60 minutes. Reaction mixture was a solid mass, but vigorous shaking liquefied the mixture. 10 g of water was added, sonicated for 2 minutes and then packed without further preparation into a 4×250 mm (diameter×length) chromatography column. Next, 4 cycles of reagent treatment were flowed at 0.5 mL/minute through the column. Each cycle of treatment included a first step a) 10% butanediol diglycidyl ether solution was flowed through the column for 10 minutes and then allowed to react at 70° C. for 20 minutes, and a second step b) 1 M 1,4-diaminobutane solution was flowed through column for 10 minutes and then allowed to react at 70° C. for 20 minutes.

Example 9

Chromatogram of Monovalent and Polyvalent Anion Standard Solution with the Third Ion Exchange Resin The chromatography column of Example 8 was installed into an ion chromatography system (Thermo Scientific ICS- 5000+ commercially available from Thermo Fisher Scientific, Sunnyvale, Calif.). A pump was used to pump deionized water at a flow rate of about 1 mL/min. A Thermo Scientific Dionex capillary EGC 500 KOH cartridge (Thermo Fisher Scientific, Sunnyvale, Calif.) was used for generating a 20 mM KOH eluent. A 25 µL injection volume of an anion standard solution was injected into an injection valve. A column heater was used to maintain a column temperature of 30° C. A chromatogram was run using the third ion exchange resin with a seven anion standard solution that contained 1 ppm fluoride, 15 ppm sulfate, 15 ppm phosphate, 3 ppm chloride, 5 ppm nitrite, 10 ppm bromide, and 10 ppm nitrate, as illustrated in FIG. 17. Carbonate was present in the standard solution from the atmosphere. A Dionex 4 mm AERS 500 suppressor was used at 50 mA along with a Thermo Scientific conductivity detector.

Example 10

Synthesis of the Fourth Ion Exchange Resin with Diaminobutane in the Base Layer Followed by Treatment with Glycidol A solution of 10% glycidol solution was flowed at 0.5 mL/minute through the column the third ion exchange resin of Example 8 for 10 minutes and then allowed to react at 70° C. for 20 minutes.

Example 11

Chromatogram of Monovalent and Polyvalent Anion Standard Solution with the Fourth Ion Exchange Resin The chromatography column of Example 10 was installed into an ion chromatography system and tested in a manner similar to Example 9. A chromatogram was run using the fourth ion exchange resin with a seven anion standard solution that contained 1 ppm fluoride, 15 ppm sulfate, 15 ppm phosphate, 3 ppm chloride, 5 ppm nitrite, 10 ppm bromide, and 10 ppm nitrate, as illustrated in FIG. 18. The phosphate peak using the fourth ion exchange resin with glycidol has shifted to a slightly longer retention time of 3.5 minutes (see FIG. 18) compared to a retention time of 3 minutes on the third ion exchange resin (see FIG. 17) using a relatively low eluent concentration of 20 mM KOH. Another chromatogram was run using the fourth ion exchange resin with a 3 anion standard solution that contained 20 ppm phosphate, 20 ppm pyrophosphate, and 20 ppm tripolyphosphate, as illustrated in FIG. 19.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. An ion exchange stationary phase comprises:
   a) a negatively charged substrate particle;
   b) a first condensation polymer reaction product attached to the negatively charged substrate particle, the first condensation polymer reaction product comprises a reaction product of a first diprimary diamine and a first polyepoxide;
   c) a second condensation polymer reaction product covalently attached to the first condensation polymer reaction product, the second condensation polymer reaction product comprises a reaction product of an amine group of the first condensation polymer reaction product and two second polyepoxides;
   wherein the amine group of the first condensation polymer reaction product includes a positive charge so that the first condensation polymer reaction product is ionically coupled to the negatively charged substrate particle;
   d) a third condensation polymer reaction product covalently attached to the second condensation polymer reaction product, the third condensation polymer reaction product comprises a reaction product of a second diprimary diamine and an epoxide group of the second condensation polymer reaction product;
   e) a fourth condensation polymer reaction product covalently attached to the third condensation polymer reaction product, the fourth condensation polymer reaction product comprises a reaction product of an amine group of the third condensation polymer reaction product and a third polyepoxide; and
   f) a fifth condensation polymer reaction product covalently attached to the fourth condensation polymer reaction product, the fifth condensation polymer reaction product comprises a reaction product of a third diprimary diamine and an epoxide group of the fourth condensation polymer reaction product;
   wherein chromatography using the ion exchange stationary phase with a 10 mM KOH eluent concentration elutes phosphate ion earlier than chloride ion;
   wherein the first, second, and third diprimary amines independently have the structure:

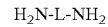

or a salt thereof, wherein each L is independently selected from substituted alkyl and unsubstituted alkyl, unsubstituted heteroalkyl, substituted aryl, unsubstituted aryl, substituted heteroaryl, and unsubstituted heteroaryl.

2. The ion exchange stationary phase of claim 1, in which the first condensation polymer reaction product comprises a plurality of quaternary amines and a plurality of hydroxyl groups.

3. The ion exchange stationary phase of claim 2, in which the second condensation polymer reaction product comprises a plurality of hydroxyl groups and a plurality of ether groups.

4. The ion exchange stationary phase of claim 3, in which the third condensation polymer reaction product comprises a plurality of quaternary amines.

5. The ion exchange stationary phase of claim 4, in which the fourth condensation polymer reaction product comprises a plurality of hydroxyl groups and a plurality of ether groups.

6. The ion exchange stationary phase of claim 5, in which the fifth condensation polymer reaction product comprises a plurality of primary amines and a plurality of secondary amines.

7. The ion exchange stationary phase of claim 1, in which the negatively charged substrate particle comprises a cross-linked divinylbenzene and ethylvinyl benzene particle, in which at least a surface of the negatively charged substrate particle includes sulfonate groups.

8. The ion exchange stationary phase of claim 1, in which the first polyepoxide compound, second polyepoxide compound, and third polyepoxide compound are each a diepoxide compound.

9. The ion exchange stationary phase of claim 8, in which the diepoxide compound is 1,4-butanediol diglycidyl ether.

10. The ion exchange stationary phase of claim 1, in which the first diprimary diamine, the second diprimary diamine, and the third diprimary diamine are the same.

11. The ion exchange stationary phase of claim 1, in which the fifth polymer layer is reacted with a glycidol.

12. The ion exchange stationary phase of claim 1, in which the first polyepoxide comprises an alkyldiol diglycidyl ether.

13. The ion exchange stationary phase of claim 1, in which the substrate particle comprises a copolymer of divinylbenzene and ethylvinylbenzene, in which the substrate particle is a negatively charged particle.

14. The ion exchange stationary phase of claim 1, in which the first diprimary diamine is selected from the group consisting of diaminoethane, diaminopropane, diaminobutane, diaminopentane, diaminohexane, lysine, diaminocyclohexane, diaminotriethylene glycol, and a combination thereof.

* * * * *